(12) United States Patent
Fujimoto et al.

(10) Patent No.: US 7,794,881 B1
(45) Date of Patent: *Sep. 14, 2010

(54) ELECTRODE FOR LITHIUM BATTERIES AND RECHARGEABLE LITHIUM BATTERY

(75) Inventors: Masahisa Fujimoto, Osaka (JP); Shin Fujitani, Hirakata (JP); Masaki Shima, Uji (JP); Hiromasa Yagi, Nishinomiya (JP); Hisaki Tarui, Shijyonawate (JP); Hiroshi Kurokawa, Katano (JP); Shigeki Matsuta, Hirakata (JP); Yoichi Domoto, Ikoma (JP); Yoshio Kato, Hirakata (JP); Hiroshi Nakajima, Hirakata (JP); Hiroaki Ikeda, Hyogo (JP); Kenji Asaoka, Sumoto (JP); Ryuji Ohshita, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/110,313

(22) PCT Filed: Oct. 20, 2000

(86) PCT No.: PCT/JP00/07293

§ 371 (c)(1),
(2), (4) Date: Apr. 11, 2002

(87) PCT Pub. No.: WO01/31721

PCT Pub. Date: May 3, 2001

(30) Foreign Application Priority Data

| Oct. 22, 1999 | (JP) | 11-301646 |
| Dec. 16, 1999 | (JP) | 11-357808 |
| Dec. 22, 1999 | (JP) | 11-365306 |
| Dec. 28, 1999 | (JP) | 11-374512 |
| Feb. 17, 2000 | (JP) | 2000-039454 |
| Feb. 24, 2000 | (JP) | 2000-047675 |
| Mar. 29, 2000 | (JP) | 2000-090583 |
| Jul. 7, 2000 | (JP) | 2000-207274 |

(51) Int. Cl.
H01M 4/40 (2006.01)
H01M 4/64 (2006.01)

(52) U.S. Cl. ............... 429/231.95; 429/209; 429/218.1; 429/231.9; 429/233; 252/182.1

(58) Field of Classification Search ............. 429/218.1, 429/231.95, 233
See application file for complete search history.

(56) References Cited

U.S. PATENT DOCUMENTS 4,997,732 A  3/1991  Austin et al. ................. 429/153

(Continued)

FOREIGN PATENT DOCUMENTS

CN  1092208 A  9/1994

(Continued)

OTHER PUBLICATIONS

Bourderau et al., "Amorphous silicon as a possible anode material for Li-ion batteries," J. Power Sources 81-82 (1999) 233-236.*

(Continued)

*Primary Examiner*—Jonathan Crepeau
*Assistant Examiner*—Tony Chuo
(74) *Attorney, Agent, or Firm*—Kubovcik & Kubovcik

(57) ABSTRACT

An electrode for a lithium battery having a thin film composed of active material capable of lithium storage and release, e.g., a microcrystalline or amorphous silicon thin film, provided on a current collector, the electrode being characterized in that a constituent of the current collector is diffused into the thin film.

36 Claims, 28 Drawing Sheets

U.S. PATENT DOCUMENTS

| | | | |
|---|---|---|---|
| 5,108,852 A | 4/1992 | Tomantschger et al. | 429/66 |
| 5,162,178 A | 11/1992 | Ohsawa et al. | 429/218 |
| 5,494,762 A * | 2/1996 | Isoyama et al. | 429/221 |
| 5,631,100 A | 5/1997 | Yoshino et al. | 429/62 |
| 5,641,591 A | 6/1997 | Kawakami et al. | 429/218 |
| 5,686,203 A | 11/1997 | Idota et al. | 429/194 |
| 5,888,670 A | 3/1999 | Kawakami | 429/231.4 |
| 6,048,646 A | 4/2000 | Xing et al. | 429/233 |
| 6,402,795 B1 * | 6/2002 | Chu et al. | 29/623.5 |
| 6,432,585 B1 * | 8/2002 | Kawakami et al. | 429/233 |
| 6,743,369 B2 | 6/2004 | Jito et al. | 216/13 |
| 6,746,802 B2 | 6/2004 | Tamura et al. | 429/245 |
| 2002/0192564 A1 | 12/2002 | Ota et al. | 429/324 |
| 2004/0224231 A1 | 11/2004 | Fujimoto et al. | 429/232 |
| 2005/0014068 A1* | 1/2005 | Takada et al. | 429/231.95 |
| 2005/0069767 A1* | 3/2005 | Tsunekawa et al. | 429/209 |

FOREIGN PATENT DOCUMENTS

| | | |
|---|---|---|
| EP | 0 817 294 A1 | 1/1998 |
| EP | 0 854 529 A1 | 7/1998 |
| EP | 0 855 752 A2 | 7/1998 |
| EP | 0 910 131 A1 | 4/1999 |
| HU | P9202646 A | 9/1995 |
| JP | 60-175375 A | 9/1985 |
| JP | 63-314762 A | 12/1988 |
| JP | 05-074479 * | 3/1993 |
| JP | 5-74479 A | 3/1993 |
| JP | 5-101830 A | 4/1993 |
| JP | 5-226004 A | 9/1993 |
| JP | 6-140045 A | 5/1994 |
| JP | 6-168737 A | 6/1994 |
| JP | 6-187994 A | 7/1994 |
| JP | 7-302588 A | 11/1995 |
| JP | 8-50922 A | 2/1996 |
| JP | 8-255610 A | 10/1996 |
| JP | 9-17441 A | 1/1997 |
| JP | 9-115523 A | 5/1997 |
| JP | 9-147856 A | 6/1997 |
| JP | 9-213339 A | 8/1997 |
| JP | 10-21928 A | 1/1998 |
| JP | 10-199524 A | 7/1998 |
| JP | 10-208740 A | 8/1998 |
| JP | 10-223221 A | 8/1998 |
| JP | 10-294098 A | 11/1998 |
| JP | 10-326628 A | 12/1998 |
| JP | 11-73946 * | 3/1999 |
| JP | 11-86854 A | 3/1999 |
| JP | 11-86875 A | 3/1999 |
| JP | 11-135115 A | 5/1999 |
| JP | 11-135130 A | 5/1999 |
| JP | 11-154508 | 6/1999 |
| JP | 11-167930 A | 6/1999 |
| JP | 11-185744 A | 7/1999 |
| JP | 11-233116 A | 8/1999 |
| JP | 11-242954 A | 9/1999 |
| JP | 11-250892 A | 9/1999 |
| JP | 11-273683 A | 10/1999 |
| JP | 11-283628 A | 10/1999 |
| JP | 11-339811 | 12/1999 |
| JP | 2000-11997 A | 1/2000 |
| JP | 2000-12088 A | 1/2000 |
| JP | 2000-12089 A | 1/2000 |
| JP | 2000-12091 A | 1/2000 |
| JP | 2000-100429 A | 4/2000 |
| JP | 2000-133276 A | 5/2000 |
| JP | 2000-149928 A | 5/2000 |
| JP | 2000-182623 A | 6/2000 |
| JP | 2000-208136 A | 7/2000 |
| JP | 2000-228187 A | 8/2000 |
| JP | 2000-294249 A | 10/2000 |
| JP | 2000-294250 A | 10/2000 |
| JP | 2000-294251 A | 10/2000 |
| JP | 2001-76710 A | 3/2001 |

OTHER PUBLICATIONS

Bourderau, S. et al.; "Amorphous Silicon as a Possible Anode Material for Li-ion Batteries"; *Journal of Power Sources*; vols. 81-82, pp. 233-236; 1999.

U.S. Appl. No. 10/111,070, filed Apr. 19, 2002, Masahisa Fujimoto et al.

U.S. Appl. No. 10/111,071, filed Apr. 19, 2002, Masahisa Fujimoto et al.

U.S. Appl. No. 10/111,073, filed Apr. 19, 2002, Masahisa Fujimoto et al.

U.S. Appl. No. 10/111,074, filed Aug. 1, 2002, Hiroaki Ikeda et al.

U.S. Appl. No. 10/111,075, filed Sep. 10, 2002, Hiroaki Ikeda et al.

Hawley's condensed Chemical Dictionary, 11th edition, pp. 1033 & 1039, 1987.

* cited by examiner (a)

(b)

(c)

ELECTRODE FOR LITHIUM BATTERIES AND RECHARGEABLE LITHIUM BATTERY

TECHNICAL FIELD

The present invention relates to a novel electrode for a lithium battery, a lithium battery and a rechargeable lithium battery utilizing the electrode.

BACKGROUND ART

The battery performance of rechargeable lithium batteries recently under intensive research and development, such as charge-discharge voltage, cycle life characteristics or storage characteristics, depends largely upon the types of the electrodes used. This has led to the attempts to better battery performance by improving active electrode materials.

The use of metallic lithium for the negative active material, although possible to construct a battery with high energy density per weight and volume, presents a problem that the lithium deposited on charge grows into dendrite which could cause internal short-circuiting.

Rechargeable lithium batteries are reported (Solid State Ionics, 113-115, p 57 (1998)) which use an electrode consisting of aluminum, silicon, tin or the like that is electrochemically alloyed with lithium on charge. Among these, a silicon electrode provides a particularly high theoretical capacity and is promising as a high-capacity negative electrode. For this reason, various rechargeable batteries using silicon for the negative electrode are proposed (Japanese Patent Laying-Open No. Hei 10-255768). However, such alloying negative electrodes fail to provide sufficient cycle characteristics since alloys, as active electrode materials, are themselves pulverized on charge and discharge to reduce current-collecting capabilities.

DISCLOSURE OF THE INVENTION

It is an object of the present invention to provide a novel electrode which, when used as an electrode of a rechargeable lithium battery, can provide a high charge-discharge capacity and excellent charge-discharge cycle characteristics, and also provide a lithium battery and a rechargeable lithium battery utilizing the novel electrode.

The present invention is an electrode, for use in lithium batteries, which has a thin film composed of active material capable of lithium storage and release and provided on a current collector. Characteristically, a constituent of the current collector is diffused into the thin film of active material.

The diffusion of the current collector constituent in the thin film, in accordance with the present invention, improves adhesion between the thin film and the current collector so that the thin film is prevented from separating from the current collector. This results in obtaining good charge-discharge cycle characteristics.

In the case where the thin film is composed of active material capable of alloy formation with lithium and the current collector is composed of a material incapable of alloy formation with lithium, the diffusion of the current collector constituent lessens expansion and shrinkage of a thin film portion in the vicinity of the current collector during storage and release of lithium, resulting the reduced stress. Accordingly, the thin film can be kept well-adhered to the current collector.

Preferably, the concentration of the current collector constituent in the thin film is higher in the vicinity of the current collector and becomes lower at a location closer to a surface of the thin film. Due to the presence of such a concentration gradient, the thin film is subjected to less expansion and shrinkage in the vicinity of the current collector so that the thin film can be kept adhered to the current collector, and is permitted to contain a relatively lager amount of active material in the vicinity of the thin film surface so that a high charge-discharge capacity can be retained.

It is preferred that the current collector constituent, when diffused into the thin film, forms a solid solution, instead of an intermetallic compound, with a thin film component. The intermetallic compound, as used herein, refers to a compound which has a specific crystal structure formed via combination of metals in specific proportions. The formation of solid solution, instead of intermetallic compound, by the thin film component and the current collector constituent improves adhesion between the thin film and the current collector, resulting in obtaining the increased charge-discharge capacity.

In the present invention, the thickness of a thin film region into which the current collector constituent is diffused is not particularly specified, but may preferably be 1 µm or greater.

The thin film in the present invention may be composed of a material capable of producing a compound or a solid solution with lithium, for example. Such a material may, for example, be at least one selected from elements from Groups IIB, IIIB, IVB and VB of the periodic table and oxides and sulfides of transition metal elements from Periods 4, 5 and 6 of the periodic table.

In the present invention, examples of elements from Groups IIB, IIIB, IVB and VB of the periodic table that can produce compounds or solid solutions with lithium include carbon, aluminum, silicon, phosphorus, zinc, gallium, germanium, arsenic, cadmium, indium, tin, antimony, mercury, thallium, lead and bismuth. Specific examples of transition metal elements from Periods 4, 5 and 6 of the periodic table include scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum series elements, hafnium, tantalum, tungsten, rhenium, osmium, iridium, platinum, gold and mercury.

Preferred among the above-listed elements is at least one selected from carbon, silicon, germanium, tin, lead, aluminum, indium, zinc, cadmium, bismuth and mercury. Silicon and/or germanium is particularly preferred.

In general, silicon is roughly classified by its crystallinity into amorphous silicon, microcrystalline silicon, polycrystalline silicon and single crystal silicon. The term "noncrystalline silicon", as used herein, is meant to encompass amorphous silicon and microcrystalline silicon and exclude polycrystalline silicon and single crystal silicon. Silicon is identified as the amorphous silicon when Raman spectroscopy detects substantial absence of a peak around 520 cm$^{-1}$ which characterizes a crystalline region, and as the microcrystalline silicon when Raman spectroscopy detects the substantial presence of a peak around 520 cm$^{-1}$ corresponding to the crystalline region and a peak around 480 cm$^{-1}$ which indicates an amorphous region. Hence, the microcrystalline silicon consists substantially of a crystalline region and an amorphous region. Silicon is identified as the single crystal silicon or polycrystalline silicon when Raman spectroscopy detects substantial absence of a peak around 480 cm$^{-1}$ corresponding to the amorphous region.

In the present invention, the silicon thin film in the microcrystalline or amorphous form is preferably used for the thin film of active material.

In addition to the above-described silicon thin film, a germanium thin film or a silicon-germanium alloy thin film may also be used as the preferred thin film in the present invention. Because silicon and germanium can be mixed with each other to produce a uniform solid solution and each of them gives good results in the present invention, the silicon-germanium alloy thin film is believed to also provide good results. The germanium thin film in the amorphous or microcrystalline form is preferably used. The silicon-germanium alloy thin film in the microcrystalline or amorphous form is preferably used. The above-described procedure applied to the silicon thin film can be followed to determine the microcrystalline or amorphous nature of the germanium and silicon-germanium alloy thin films.

The electrode for a lithium battery, in accordance with a limited aspect of the present invention, has a thin film composed of active material capable of lithium storage and release and provided on a current collector, and is characterized in that the thin film is an amorphous or microcrystalline silicon thin film and has a mixed layer of a current collector material and silicon at an interface between the current collector and the silicon thin film. This mixed layer is a layer formed via diffusion of the current collector material into the silicon thin film.

In the present invention, it is preferred that the thin film is divided into columns by gaps formed therein in a manner to extend in its thickness direction and the columnar portions are at their bottoms adhered to the current collector. It is also preferred that a thickness portion of the thin film that occupies at least a half of its thickness is preferably divided into columns by such gaps.

Preferably, the gaps are formed by the expansion and shrinkage of the thin film, which may be caused by a charge-discharge reaction, for example. Accordingly, the gaps may be formed by the charge-discharge reaction either after or before the electrode is assembled into a battery. Illustrating one method of forming such gaps in the thin film before it is subjected to a charge-discharge process, the thin film of the electrode before being assembled into a battery is allowed to store and then release lithium or the like so that the thin film is made to expand and then shrink in volume, thereby forming the gaps. Where lithium(Li)-free active material is used for a positive electrode, assembling may be performed with lithium being stored in the thin film. Also, the thin film divided by gaps into columns can be lithographically formed by utilizing a resist film patterned by photolithography.

In the case where the thin film has irregularities on its surface, the aforementioned gaps may be formed in the thin film to extend in its thickness direction from valleys of the irregularities on the thin film surface toward the current collector. The irregularities on the thin film surface may conform in shape to those on the current collector surface. That is, depositing the thin film on the current corrector with such irregularities results in the formation of the corresponding irregularities on the surface of the thin film.

The columnar portions of the thin film may have various top shapes, but preferably have a round top shape.

The gaps may be formed in advance in the thin film in a manner to extend in its thickness direction along the low-density regions. Such low-density regions may be connected to each other like a network in a planar direction and extend in the thickness direction toward the current collector, for example.

A surface roughness Ra of the current collector is preferably 0.01 μm or larger, more preferably in the range of 0.01-1 μm, most preferably in the range of 0.05-0.5 μm. The surface roughness Ra, which is specified in Japanese Industrial Standards (JIS B 0601-1994), can be measured by a surface roughness meter, for example.

In the present invention, the surface roughness Ra of the current collector preferably satisfies the relationship $Ra \leq t$, where t is a thickness of the thin film of active material. It is also preferred that the surface roughness Ra of the current collector and the mean spacing of local peaks of profile S satisfy the relationship $100\ Ra \geq S$. The mean spacing of local peaks of profile S, which is specified in Japanese Industrial Standards (JIS B 0601-1994), can be measured by a surface roughness meter, for example.

The shape of the projections on the current collector surface is not particularly specified, but may preferably be substantially conical, for example.

The current collector for use in the present invention is not particularly specified in type, so long as it assures good adhesion to the overlying active thin film. More specifically, the current collector may comprise at least one selected from copper, nickel, stainless steel, molybdenum, tungsten and tantalum, for example.

The current collector is preferably thin and thus preferably in the form of a metal foil. Preferably, the current collector is composed of a material incapable of alloy formation with lithium. Copper is particularly preferred. The current collector is preferably in the form of a copper foil which is preferably roughened at its surface. A typical example of such a copper foil is an electrolytic copper foil. This electrolytic copper foil can be obtained, for example, from an electrolyte containing copper ions: A metallic drum is immersed in the electrolyte solution and rotated. The introduction of current results in the electrodeposition of copper on a surface of the drum. The electrolytic copper foil is then obtained by removing the deposited copper from the drum. The electrolytic copper foil may be subjected to surface roughening or other surface treatment at either one or both sides thereof.

As the current collector, a rolled copper foil, whose surface is roughened by depositing copper thereon via an electrolytic process, may be used.

Also, an interlayer may be provided between the current collector and the thin film of active material. In such an instance, the interlayer preferably contains a constituent easy to diffuse into the thin film, e.g., a copper layer. Such a copper layer may be superimposed on a surface-roughened nickel foil (e.g., electrolytic nickel foil) to provide the current collector. Alternatively, copper may be deposited on a nickel foil by an electrolytic process during which the nickel foil is roughened at its surface.

In the present invention, the thin film of active material can be formed on the current collector by various methods which include, for example, CVD, sputtering, vapor evaporation, spraying and plating processes. Particularly preferred among such thin film forming methods are CVD, sputtering and vapor evaporation processes.

The thin film of active material in the present invention may be doped with an impurity. Examples of such impurities include elements of the periodic Groups IIIB, IVB, VB and VIB, such as phosphorus, aluminum, arsenic, antimony, boron, gallium, indium, oxygen and nitrogen.

Also, the thin film of active material in the present invention may be made up of a sequence of superimposed layers. These layers may differ from each other in terms of composition, crystallinity, impurity concentration or the like. Such layers may provide a thin film structure graded in its thickness direction. For example, such layers, if properly arranged, can provide a thin film structure wherein the composition, crystallinity, impurity concentration or the like is varied in its thickness direction.

Preferably, the thin film of active material in the present invention stores lithium via formation of an alloy with lithium.

Lithium may be previously incorporated in the thin film in the present invention. Lithium may be added during formation of the thin film. That is, lithium may be introduced by formation of a lithium-containing thin film. Alternatively, lithium may be added or stored after formation of the thin film. One method is to use an electrochemical mechanism whereby lithium is added or stored in the active thin film.

The thickness of the thin film in the present invention is not particularly specified, but may be 20 μm or below. For the purpose of obtaining a high charge-discharge capacity, the thickness is preferably maintained at 1 μm or above.

In the present invention, an interlayer may be provided between the current collector and the thin film to improve adhesion therebetween. Preferably, such an interlayer may comprise a material capable of alloy formation with the current collector material and the active material.

The lithium battery of the present invention is characterized as including a negative electrode comprised of the above-described electrode of the present invention, a positive electrode and an electrolyte.

The term "lithium battery", as used herein, encompasses a lithium primary battery and a lithium secondary battery. Accordingly, the electrode of the present invention is applicable to lithium primary batteries as well as to lithium secondary batteries.

The rechargeable lithium battery (lithium secondary battery) of the present invention is characterized as including a negative electrode comprised of the above-described electrode of the present invention, a positive electrode and a nonaqueous electrolyte.

An electrolyte solvent for use in the rechargeable battery of the present invention is not particularly limited in type and is illustrated by a mixed solvent which contains cyclic carbonate such as ethylene carbonate, propylene carbonate or butylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane or a chain ester such as γ-butyrolactone, sulfolane or methyl acetate. Illustrative electrolyte solutes are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Other applicable electrolytes include a gelled polymer electrolyte comprised of an electrolyte solution impregnated into a polymer electrolyte such as polyethylene oxide, polyacrylonitrile or polyvinylidene fluoride and inorganic solid electrolytes such as LiI and $Li_3N$, for example. The electrolyte for the recharageable lithium battery of the present invention can be used without limitation, so long as an Li compound as its solute that imparts an ionic conductivity, as well as its solvent that dissolves and retains the Li compound, remain undecomposed at voltages during charge, discharge and storage of the battery.

Examples of positive active materials for the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; lithium-free metal oxides such as $MnO_2$; and the like. Other substances can also be used, without limitation, if they are capable of electrochemical insertion and release of lithium.

The electrode of the present invention is believed to be also useful for an electrode for nonaqueous electrolyte batteries and nonaqueous electrolyte rechargeable batteries which contain electrode active materials capable of storing and releasing alkaline metals other than lithium, such as sodium and potassium, and alkaline earth metals such as magnesium and calcium.

BEST MODE FOR CARRYING OUT THE INVENTION

Figure 1:
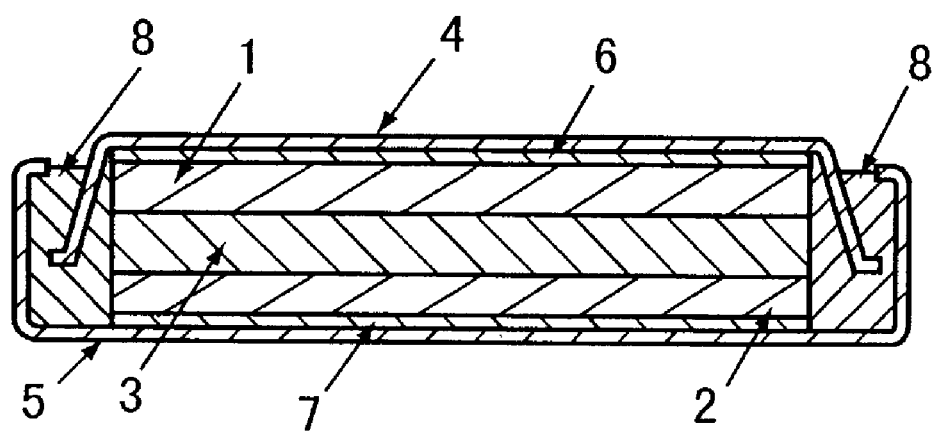
FIG. 1 is a schematic sectional view of a rechargeable lithium battery fabricated in Examples in accordance with the present invention.

The present invention is below described in more detail by way of examples. It will be recognized that the following examples merely illustrate the practice of the present invention but are not intended to be limiting thereof. Suitable changes and modifications can be effected without departing from the scope of the present invention.

Experiment 1

Fabrication of Negative Electrode

A microcrystalline silicon thin film was formed on a rolled copper foil (18 μm thick) by a CVD method, using the rolled copper foil as a substrate, silane ($SiH_4$) as a source gas and a hydrogen gas as a carrier gas. Specifically, the copper foil as a substrate was placed on a heater within a reaction chamber. An interior of the reaction chamber was evacuated by a vacuum evacuator to a pressure of 1 Pa or lower. The silane gas as a source gas and the hydrogen ($H_2$) gas as a carrier gas were introduced via a source gas inlet port. The substrate was heated to 180° C. on the heater. A degree of vacuum was adjusted by the vacuum pumping apparatus to a reaction pressure. An RF power supply was operated to excite a radio frequency wave which is introduced via an electrode to induce a glow discharge. Detailed thin-film forming conditions are listed in Table 1. In Table 1, a volumetric unit, sccm, indicates a volumetric flow rate ($cm^3$/minute) of a fluid at 0° C. at 1 atmospheric pressure (101.33 kPa) per minute and is an abbreviation of standard cubic centimeters per minute.

TABLE 1

| Conditions | During Film Formation |
| --- | --- |
| Source Gas ($SiH_4$) Flow Rate | 10 sccm |
| Carrier Gas ($H_2$) Flow Rate | 200 sccm |
| Substrate Temperature | 180° C. |
| Reaction Pressure | 40 Pa |
| RF Power | 555 W |

The microcrystalline silicon thin film was deposited under the above-specified conditions to a thickness of about 10 μm. Observation by an electron microscope (at 2,000,000× magnification) ascertained noncrystallinity of the thin film in the way that an amorphous region was arranged to surround a crystalline region consisting of microfine crystal grains. A 17 mm diameter piece was punched out from the resulting sample to provide an electrode a1. A piece identical to the electrode a1 was subjected to heat treatment at 400° C. for 3 hours to provide an electrode a2.

For comparative purposes, 90 parts by weight of commercially available single crystal silicon powder (particle diameter of 10 μm) and 10 parts by weight of polytetrafluoroethylene as a binder were mixed. This mixture was pressed in a 17 mm diameter mold to obtain a pellet-form electrode b1.

(Fabrication of Positive Electrode)

Starting materials, $Li_2CO_3$ and $CoCO_3$, were weighed such that the atomic ratio of Li and Co, Li:Co, was brought to 1:1, and then mixed in a mortar. The mixture was pressed in a 17 mm diameter mold and calcined in the air at 800° C. for 24 hours to obtain a calcined product consisting of $LiCoO_2$. This was subsequently ground into particles with a mean particle diameter of 20 μm.

80 parts by weight of the resulting $LiCoO_2$ powder, 10 parts by weight of acetylene black as a conducting material and 10 parts by weight of polytetrafluoroethylene as a binder were mixed. The mixture was pressed in a 17 mm diameter mold to obtain a pellet-form positive electrode.

(Preparation of Electrolyte Solution)

1 mole/liter of $LiPF_6$ was dissolved in a mixed solvent containing equi-volumes of ethylene carbonate and diethyl carbonate to prepare an electrolyte solution for use in the following battery construction.

(Construction of Battery)

A coin type rechargeable lithium battery was constructed using the above-fabricated electrode a1, a2 or b1 for the negative electrode, and the above-fabricated positive electrode and the above-prepared electrolyte solution.

FIG. 1 is a schematic sectional view, illustrating a such-constructed rechargeable lithium battery which includes a positive electrode 1, a negative electrode 2, a separator 3, a positive can 4, a negative can 5, a positive current collector 6, a negative current collector 7 and an insulating gasket 8 made of polypropylene.

The positive electrode 1 and negative electrode 2 are disposed on opposite sides of the separator 3. These are enclosed in a battery case composed of the positive can 4 and negative can 5. The positive electrode 1 is connected to the positive can 4 by the positive current collector 6. The negative electrode 2 is connected to the negative can 5 by the negative current collector 7. Such construction enables charge and discharge as a secondary battery.

As a result, batteries A1, A2 and B1 were constructed using the electrodes a1, a2 and b1 for the negative electrode, respectively.

(Measurement of Charge-Discharge Cycle Life Characteristics)

Each battery, excepting the battery B1, was charged at a current of 100 μA at 25° C. until a negative electrode capacity reached 2,000 mAh/g, and then discharged. This was recorded as a unit charge-discharge cycle. Cycling was effected to measure a 50th-cycle capacity retention rate for each battery. The battery B1, which could not be charged to 2,000 mAh/g, was subjected to a cycle test wherein it was charged to 4.2 V and then discharged. The results are given in Table 2.

In Table 2, a hydrogen concentration obtained from SIMS measurement, a ratio of peak intensities around 480 $cm^{-1}$ and 520 $cm^{-1}$ as determined by Raman spectral analysis, and a crystal grain size calculated from an X-ray diffraction spectrum and the Scherrer's equation, all for the negative active material of each battery, are also given. Also, the crystal grain size of the negative active material of the battery B1 is given by the particle diameter of the powder since both are considered to be almost equal in value to each other.

TABLE 2

| Battery | 50th-Cycle Capacity Retention Rate | Hydrogen Content | Ratio of Peak Intensities (480 $cm^{-1}$/520 $cm^{-1}$) | Crystal Grain Size |
| --- | --- | --- | --- | --- |
| A1 | 85% | 4% | 0.1 | 1 nm |
| A2 | 78% | 0.01% | 0.1 | 1 nm |
| B1 | 5% | 0% | 0 | 10 μm |

As can be clearly seen from the results shown in Table 2, the batteries A1 and A2 in accordance with the present invention both exhibit markedly higher capacity retention rates compared to the comparative battery B1.

As such, the use of the microcrystalline silicon thin film for the negative active material results in the marked improvement of charge-discharge cycle characteristics of the rechargeable lithium battery. This is believed due to the following reason: In the microcrystalline silicon thin film, the moderation of expansion and shrinkage which occurs when lithium is stored and released prevents the negative active material from being pulverized and thereby suppresses the possible reduction of current collecting capability.

Experiment 2

The procedure used in Experiment 1 to construct the battery A1 was followed, except that an electrolytic copper foil (18 μm thick) was used for the current collector as a substrate. That is, a microcrystalline silicon thin film (about 10 μm thick) was deposited on the electrolytic copper foil to fabricate an electrode a3. Using this electrode, a battery A3 was constructed.

Also, the rolled copper foil used in Experiment 1 was subjected to a one-minute griding treatment with a #400 or #120 emery paper to provide a ground copper foil. The procedure used in Experiment 1 to construct the battery A1 was followed, except that such a ground copper foil was used for the current collector as a substrate. That is, a microcrystalline silicon thin film (about 10 μm thick) was deposited on the copper foil to fabricate an electrode. The electrode fabricated using the copper foil ground with a #400 emery paper was designated as an electrode a4 and the electrode fabricated using the copper foil ground with a #120 emery paper was designated as an electrode a5. These electrodes were used to construct batteries A4 and A5 in the same manner as in Experiment 1.

These batteries A3-A5 and the batteries A1 and B1 constructed in Experiment 1 were subjected to a charge-discharge cycle test under the same conditions used in Experiment 1 to obtain a 10th-cycle capacity retention rate for each. The results are given in Table 3. Also given in Table 3 are a surface roughness Ra and a mean spacing of local peaks S for the copper foil, as a current collector, of each of the batteries A1, B1 and A3-A5.

The surface roughness Ra and the mean spacing of local peaks S for each copper foil were measured using a stylus profiler Dektak ST (available from ULVAC Inc.) with a scanning distance of 2.0 mm. The surface roughness Ra was calculated after correction of a deflection portion. The deflection portion was collected using the correction values with a low pass=200 μm and a high pass=20 μm. The surface roughness Ra was automatically calculated and the mean spacing of local peaks S was read from the chart.

TABLE 3

| Battery | 10th-Cycle Capacity Retention Rate | Current Collector (Copper Foil) | |
| --- | --- | --- | --- |
| | | Surface Roughness Ra (μm) | Mean Spacing S (μm) |
| A1 | 97% | 0.037 | 14 |
| A3 | 99% | 0.188 | 11 |
| A4 | 98% | 0.184 | 9 |
| A5 | 99% | 0.223 | 8 |
| B1 | 20% | 0.037 | 14 |

As can be clearly seen from the results given in Table 3, the batteries A3-A5 using the copper foils with higher values of surface roughness Ra for the current collector exhibit improved 10th-cycle capacity retention rates compared to the battery A1 using the copper foil with the lowest value of surface roughness Ra. This is considered due to the following reason: The copper foil with a higher value of surface roughness Ra, when used for the current collector, improves adhesion between the current collector and the active material. This adhesion improvement reduces the influence of structural change, such as falling-off of the active material that occurs when it expands or shrinks during storage or release of lithium.

Experiment 3

The batteries A1 and A3 respectively constructed in Experiments 1 and 2 were further subjected to a charge-discharge cycle test under the same test conditions as used in the Experiment 1 to measure a 30th-cycle capacity retention rate. The results are shown in Table 4.

TABLE 4

| Battery | 30th-Cycle Capacity Retention Rate |
| --- | --- |
| A1 | 91% |
| A3 | 97% |

As can be clearly seen from the results given in Table 4, the batteries A1 and A3 exhibit good capacity retention rates even on the 30th-cycle. Particularly, the battery A3 using the copper foil with a higher value of surface roughness Ra for the current collector exhibits good capacity retention rate.

Figure 2:
FIG. 2 is a photomicrograph (at a magnification of 2,000×) taken using a scanning electron microscope, showing an electrode in accordance with one embodiment of the present invention in its state before charge and discharge.
Figure 3:
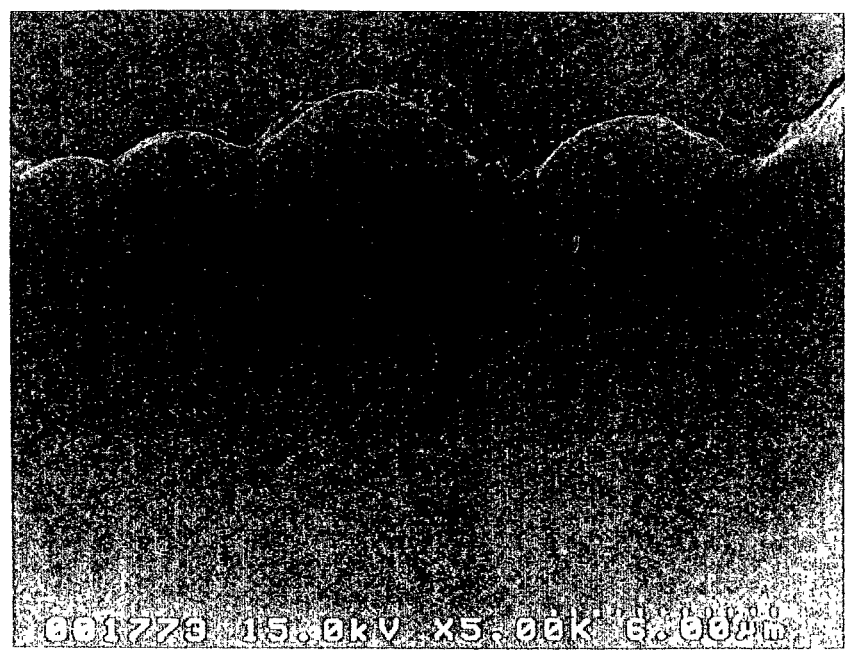
FIG. 3 is a photomicrograph (at a magnification of 5,000×) taken using a scanning electron microscope, showing an electrode in accordance with one embodiment of the present invention in its state before charge and discharge.

The electrode a3 incorporated in the battery A3 was viewed under an electron microscope to observe a condition of its silicon thin film. First, the electrode a3 in its state prior to being incorporated in the battery, i.e., before charge and discharge, was observed using a scanning electron microscope. FIGS. 2 and 3 are photomicrographs (secondary electron images) taken with a scanning electron microscope, both showing the electrode a3 in its state before charge and discharge. FIGS. 2 and 3 are taken at 2,000× and 5,000× magnifications, respectively.

The electrode was embedded in a resin and then sliced to provide a sample. The layers of the embedding resin are found in upper and lower end portions of FIG. 2 and in an upper end portion of FIG. 3.

In FIGS. 2 and 3, a portion that appears slightly light indicates the copper foil. The deposited silicon thin film (about 10 μm thick) is found as a dark portion on the copper foil. As shown in FIGS. 2 and 3, irregularities are formed on a surface of the copper foil. Particularly, projections have a generally conical shape. Similar irregularities are formed on a surface of the silicon thin film deposited on the copper foil. Accordingly, the surface irregularities of the silicon thin film appear to generally conform in shape to those formed on the copper foil surface.

Next, the electrode a3 was removed from the battery A3 after 30 cycles, embedded in a resin, and then subjected to observation under a scanning electron microscope in the same manner as described previously. Here, the electrode a3 was removed after discharge. Thus, the observed electrode a3 was in its state after discharge.

Figure 4:
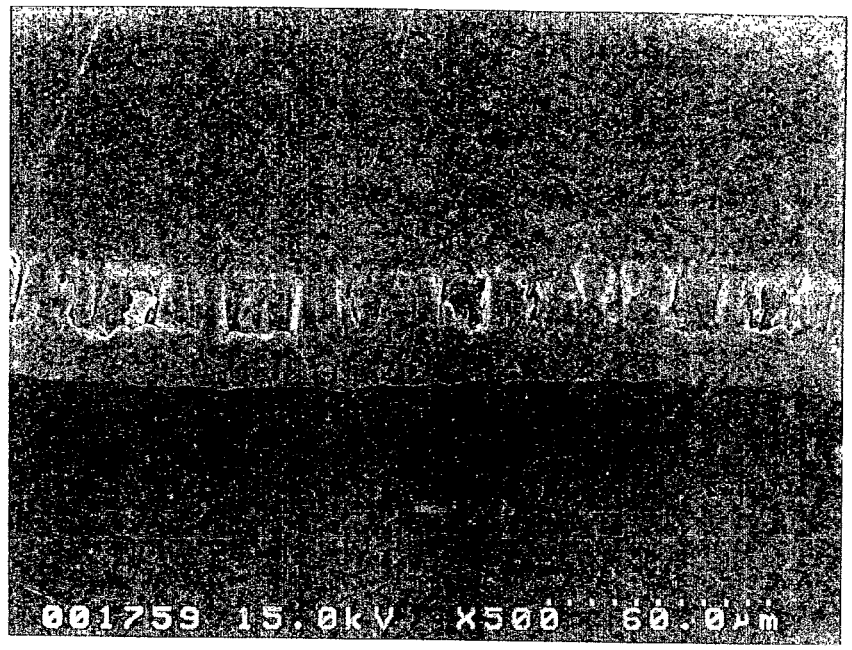
FIG. 4 is a photomicrograph (at a magnification of 500×) taken using a scanning electron microscope, showing an electrode in accordance with one embodiment of the present invention in its state after charges and discharges.
Figure 5:
FIG. 5 is a photomicrograph (at a magnification of 2,500×) taken using a scanning electron microscope, showing an electrode in accordance with one embodiment of the present invention in its state after charges and discharges.

FIGS. 4 and 5 are photomicrographs (secondary electron images) taken with a scanning electron microscope, each showing the electrode a3 after discharge. FIGS. 4 and 5 are taken at 500× and 2,500× magnifications, respectively.

As shown in FIGS. 4 and 5, the silicon thin film has gaps that extend in its thickness direction and divide the silicon thin film into columns. Gaps are barely found to extend in a planar direction. A bottom of each columnar portion is found to adhere well to the copper foil as a current collector. Also, each columnar portion has a round top. It is thus understood that these gaps are formed to originate from the valleys of irregularities that were found on the surface of the silicon thin film in its state before charge and discharge.

Figure 6:
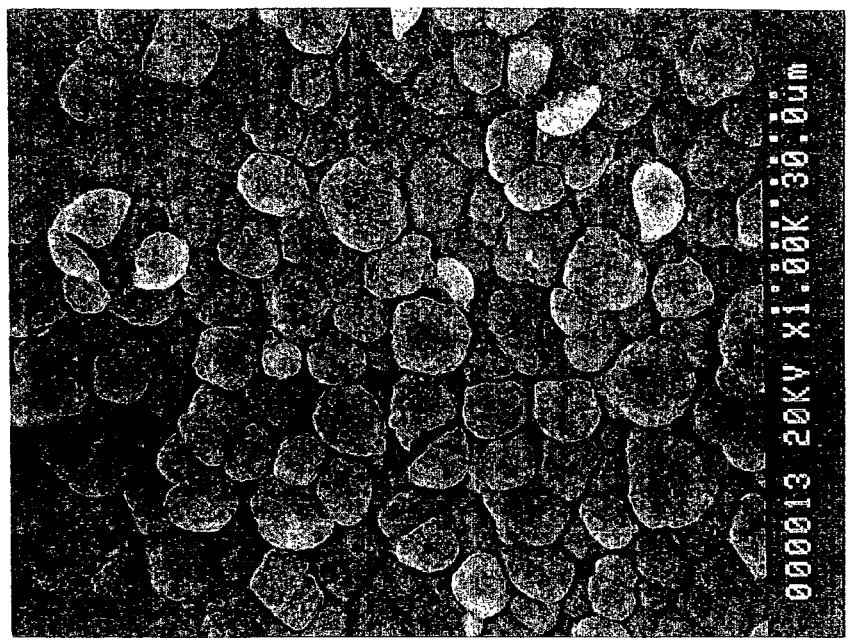
FIG. 6 is a photomicrograph (at a magnification of 1,000×) taken using a scanning electron microscope, showing a silicon thin film of an electrode in accordance with one embodiment of the present invention when viewed from above.
Figure 7:
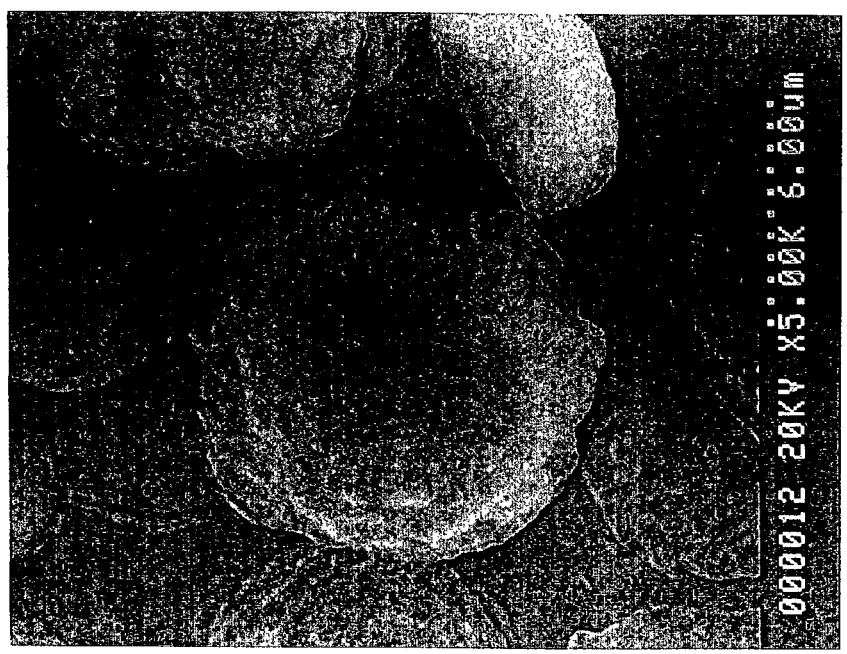
FIG. 7 is a photomicrograph (at a magnification of 5,000×) taken using a scanning electron microscope, showing a silicon thin film of an electrode in accordance with one embodiment of the present invention when viewed from above.
Figure 8:
FIG. 8 is a photomicrograph (at a magnification of 1,000×) taken using a scanning electron microscope, showing a silicon thin film of an electrode in accordance with one embodiment of the present invention when viewed from a slight angle.
Figure 9:
FIG. 9 is a photomicrograph (at a magnification of 5,000×) taken using a scanning electron microscope, showing a silicon thin film of an electrode in accordance with one embodiment of the present invention when viewed from a slight angle.

Further, the surface of the silicon thin film of the electrode a3 after charges and discharges was observed with a scanning electron microscope. FIGS. 6 and 7 are photomicrographs (secondary electron images) taken with a scanning electron microscope, each showing the surface of the silicon thin film when viewed from above. FIGS. 6 and 7 are taken at 1,000× and 5,000× magnifications, respectively. FIGS. 8 and 9 are photomicrographs (secondary electron images) taken with a scanning electron microscope, each showing the surface of the silicon thin film when viewed at a slight angle. FIGS. 8 and 9 are taken at 1,000× and 5,000× magnifications, respectively.

As shown in FIGS. 6-9, the gaps are formed in such a way to surround the columnar portions of the silicon thin film so that spaces are defined between neighboring columnar portions. When the silicon thin film stores lithium on charge, the columnar portions will expand and increase in volume. This increment in volume, however, is believed to be accommodated by those spaces provided around the columnar portions. On discharge, the columnar portions of the silicon thin film release the lithium and shrink to decrease in volume. This decrement in volume is believed to restore the spaces around the columnar portions. Such a columnar structure of the silicon thin film is effective to relax a stress caused by expansion and shrinkage of the active material on charge and discharge, so that falling-off of the active silicon thin film from the current collector can be prevented.

The formation of the gaps which divide the silicon thin film into columns results in a marked increase in contact area thereof with the electrolyte solution. Also, the columnar portions are almost comparable in size to each other. These are believed to allow efficient occurrence of a charge-discharge reaction accompanying storage and release of lithium in the thin film of active material.

Since the individual columnar portions of the silicon thin film adhere to the current collector, as shown in FIGS. 4 and 5, good electrical connection is provided between the active material and the current collector. This is believed to allow efficient occurrence of the charge-recharge reaction.

As also shown in FIGS. 6-9, each columnar portion has a round top. This provides an electrode structure which prevents localized current concentration and reduces the occurrence such as of a deposition reaction of a lithium metal.

Figure 10:
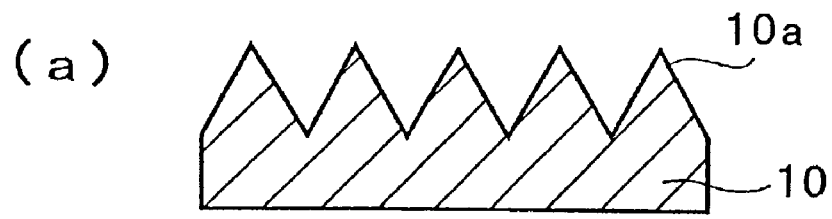
FIG. 10 is a schematic sectional view, showing a silicon thin film in the process of being divided by gaps into columns.
Figure 10:
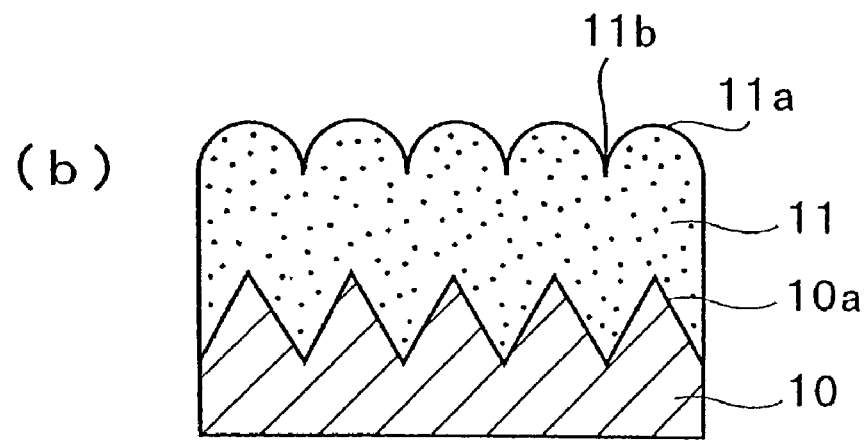
Figure 10:
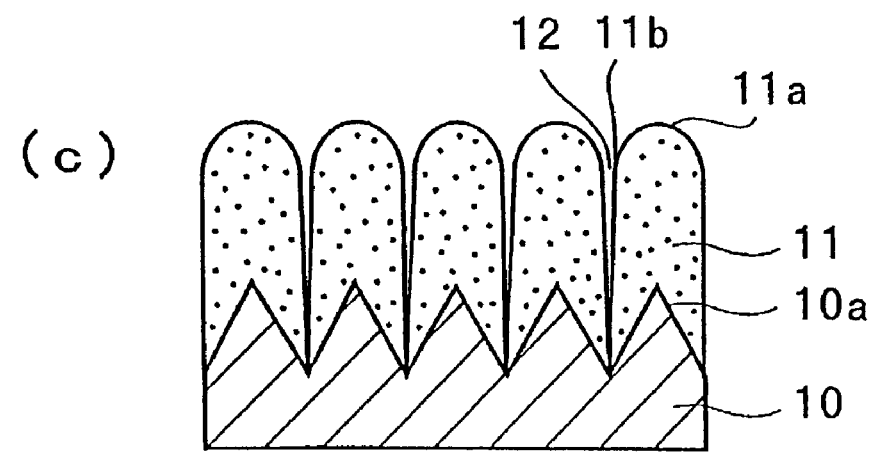

FIG. 10 is a schematic sectional view, illustrating a process whereby the silicon thin film deposited on a copper foil is divided into columns by the gaps formed therein.

As shown in FIG. 10(a), the copper foil 10 has irregularities on its surface 10a. The copper foil with the increased value for surface roughness Ra has the larger irregularities.

FIG. 10(b) illustrates a noncrystalline silicon thin layer 11 deposited on a rough surface 10a of the copper foil 10. The surface 11a of the silicon thin film 11 is influenced by the irregularities on the surface 10a of the copper foil 10 to have similar irregularities. Before charge and discharge, the silicon thin film 11 remains undivided, as shown in FIG. 10(b). When charging is effected, the silicon thin film 11 stores lithium therein and expands in volume. During the charge, the silicon thin film 11 appears to expand in both thickness and planar directions of the thin film, although the detail is not clear. During the subsequent discharge reaction, the silicon thin film 11 releases lithium therefrom and shrinks in volume. At this time, a tensile stress is produced in the silicon thin film 11. Probably, such a stress concentrates at valleys 11b of the irregularities on the surface 11a of the silicon thin film 11 to result in the formation of gaps 12 that originate from the valleys 11b and extend in the thickness direction, as shown in FIG. 10(c). Conceivably, the gaps 12 such formed relax the stress to allow the silicon thin film 11 to shrink without occurrence of falling-off from the copper foil 10.

In the silicon thin film divided into columns in the fashion as described above, the spaces provided around the columnar portions serve to relax the stress resulting from expansion and shrinkage of the active material during the succeeding charge-discharge cycles. This appears to assure repetitive charge-discharge cycling while preventing falling-off of the active material from the current collector.

Figure 11:
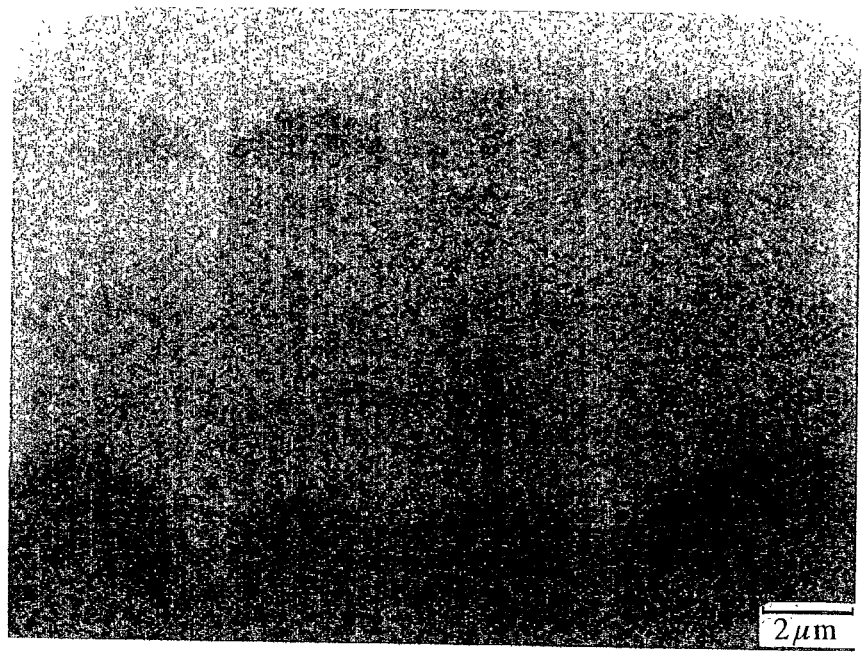
FIG. 11 a photomicrograph (at a magnification of 12,500×) taken using a transmission electron microscope, showing a section of a silicon thin film of an electrode a3 in accordance with the present invention.

Further, the electrode a3 incorporating an about 10 μm thick, microcrystalline silicon thin film deposited on an electrolytic copper foil was observed under a transmission electron microscope to study a mechanism whereby the gaps are formed in the silicon thin film. FIG. 11 is a photomicrograph (at a magnification of 12,500×) taken with a transmission electron microscope, showing a section of the electrode a3 before charge and discharge. The observation sample was prepared by slicing the resin-embedded electrode.

Figure 13:
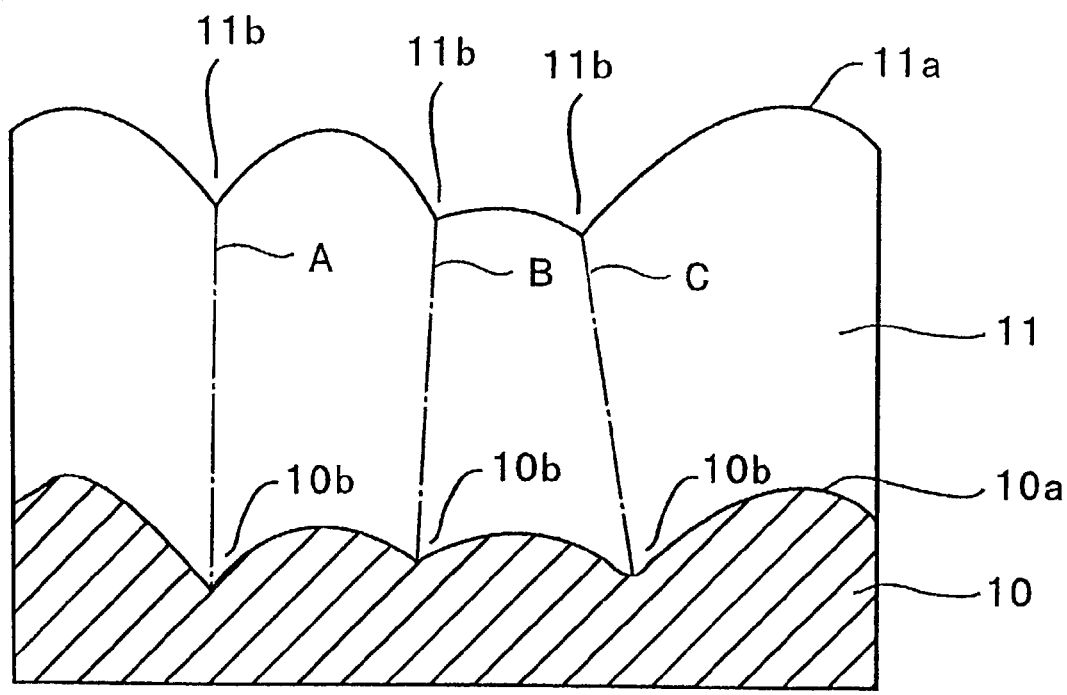
FIG. 13 is a diagrammatic representation of the photomicrograph of FIG. 11.

FIG. 13 is a diagrammatic representation of the photomicrograph of FIG. 11. In the photomicrograph of FIG. 11 taken with a transmission electron microscope, the silicon thin film 11 is deposited on the surface 10a of the electrolytic copper foil 10, as diagrammatically shown in FIG. 13. The silicon thin film 11 appears light relative to the copper foil 10 in the photomicrograph taken with a transmission electron microscope. In the silicon thin film shown in FIG. 11, light portions are observed in the regions extending between respective valleys 11b and 10b of the irregularities on the surfaces 11a and 10a of the silicon thin film 11 and copper foil 10. These light portions are indicated by single-dotted chain lines A, B and C in FIG. 13. Particularly, the light portion is observed more clearly in the region indicated by A. These regions are considered to be low in density, i.e., low-density regions of the silicon thin film 11. For the purpose of observing such low-density regions in more detail, an electrode a6 was fabricated by depositing an about 2 μm thick, microcrystalline silicon thin film on an electrolytic copper foil under the same conditions as used in the fabrication of the electrode a3.

Figure 12:
FIG. 12 a photomicrograph (at a magnification of 25,000×) taken using a transmission electron microscope, showing a section of a silicon thin film of an electrode a6 in accordance with the present invention.
Figure 14:
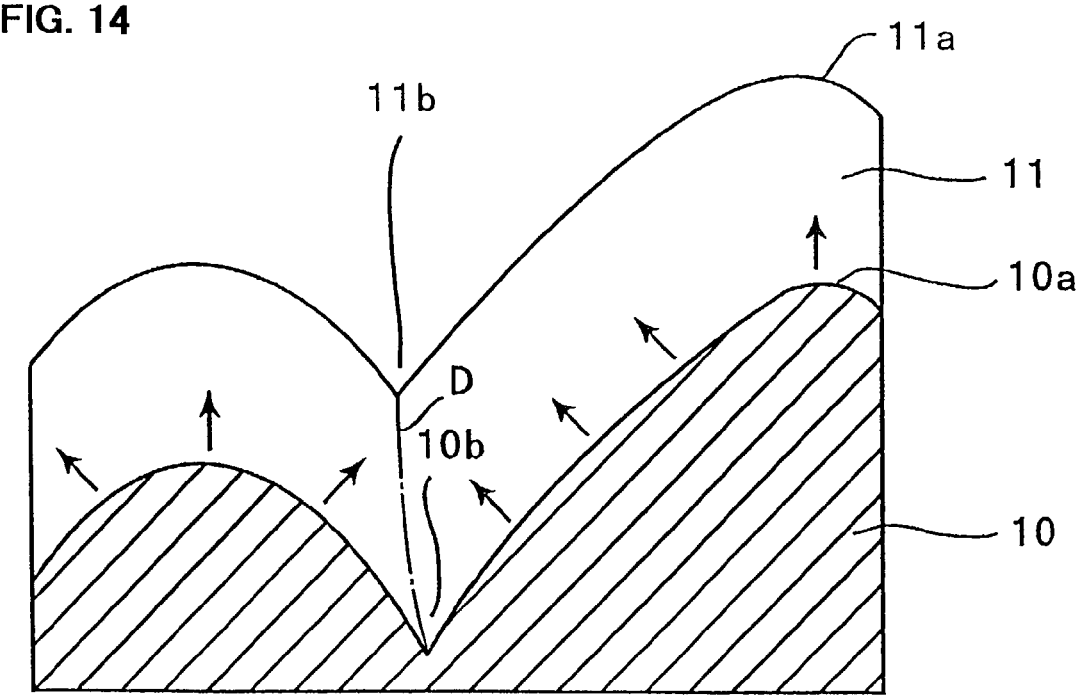
FIG. 14 is a diagrammatic representation of the photomicrograph of FIG. 12.

FIG. 12 is a photomicrograph taken by a transmission electron microscope, showing the electrode a6 when observed in the same manner as described above. FIG. 12 is taken at a magnification of 25,000×. FIG. 14 is a diagrammatic representation of the photomicrograph of FIG. 12. As clear from FIG. 12, a low-density region is also observed in the region D of the electrode a6 that extends between the respective valleys 11b, 10b of the irregularities on the surfaces 11a, 10a of the silicon thin film 11 and the copper foil 10. A detailed observation of the photomicrograph of FIG. 12 reveals a number of fine lines extending in directions shown by the arrows in FIG. 14. It seems very likely that such lines are formed as the silicon thin film grows. It accordingly appears that the silicon thin film 11 grows generally perpendicularly to the surface 10a of the copper foil 10. It also appears that the silicon thin film layer grows in such a direction to collide at the region D with an adjacent silicon thin film layer being deposited and growing on the adjacent inclined surface of the copper foil. Thus the formation of the low-density region D is very likely to have resulted from such a collision at the region D. It also appears that the collision of the silicon thin film layers with each other is continued till the end of thin film formation, and formation of the low-density region also continues until reaching the surface of the silicon thin film.

Figure 15:
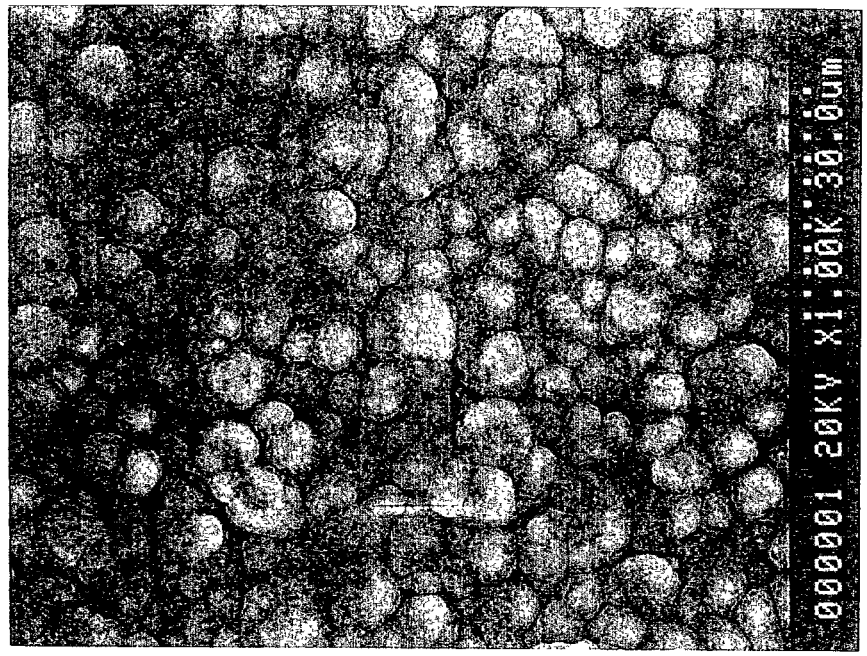
FIG. 15 is a photomicrograph (at a magnification of 1,000×) taken using a scanning electron microscope, showing a silicon thin film surface of an electrode a3 in accordance with the present invention when viewed from above.

FIG. 15 is a photomicrograph (secondary electron image) taken with a scanning electron microscope, showing a surface of a silicon thin film of an electrode a3 when observed from above. The electrode a3 shown in FIG. 15 is in its state before charge and discharge. FIG. 15 is viewed at 1,000× magnification. In FIG. 15, portions appearing lightened indicate projections on a surface of the silicon thin film and the surrounding portions appearing darkened indicate valleys on the surface of the silicon thin film. As shown in FIG. 15, the valleys on the surface of the silicon thin film are connected to each other like a network. It is accordingly found that the low-density regions define a continuous network in a plane of the silicon thin film. As shown in FIGS. 11 and 13, such a reticulated low-density region also extends in a thickness direction toward the current collector. The dark portions in FIG. 15 do not indicate the gaps (spaces). This is apparent from the fact that no gap (space) is observed which extends in the thickness direction of the thin film in the photomicrographs of FIGS. 2 and 3 taken by a scanning electron microscope.

Figure 16:
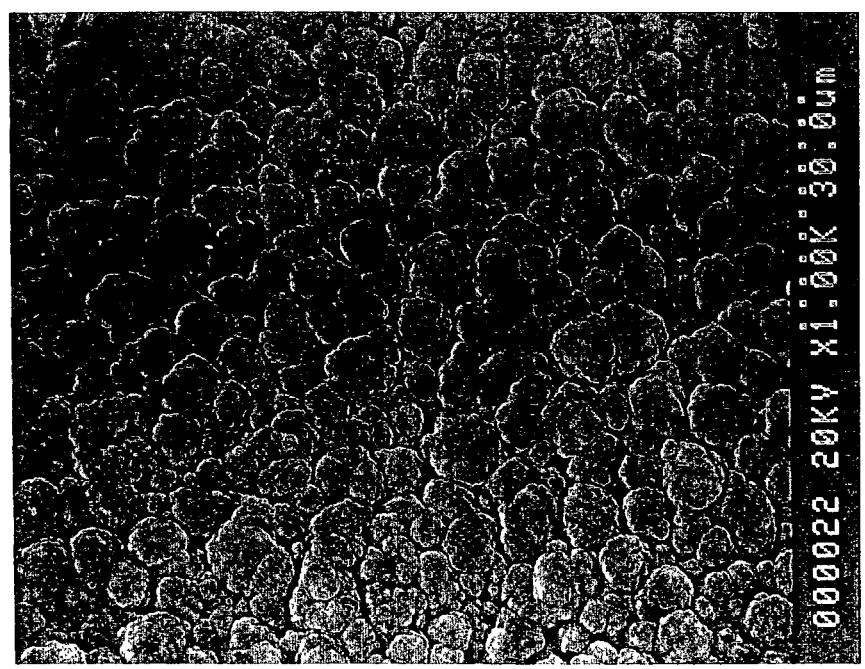
FIG. 16 is a photomicrograph (at a magnification of 1,000×) taken using a scanning electron microscope, showing a silicon thin film surface of an electrode a6 in accordance with the present invention when viewed from above.

FIG. 16 is a photomicrograph (secondary electron image) taken at a magnification of 1,000 using a scanning electron microscope, showing a surface of a silicon thin film, when observed from above, of an electrode a6 in its state before charge and discharge. As apparent from FIG. 16, the valleys in the electrode a6 are also connected to each other like a network. It is accordingly found that the low-density regions are arranged like a network continuous in a planar direction.

Figure 17:
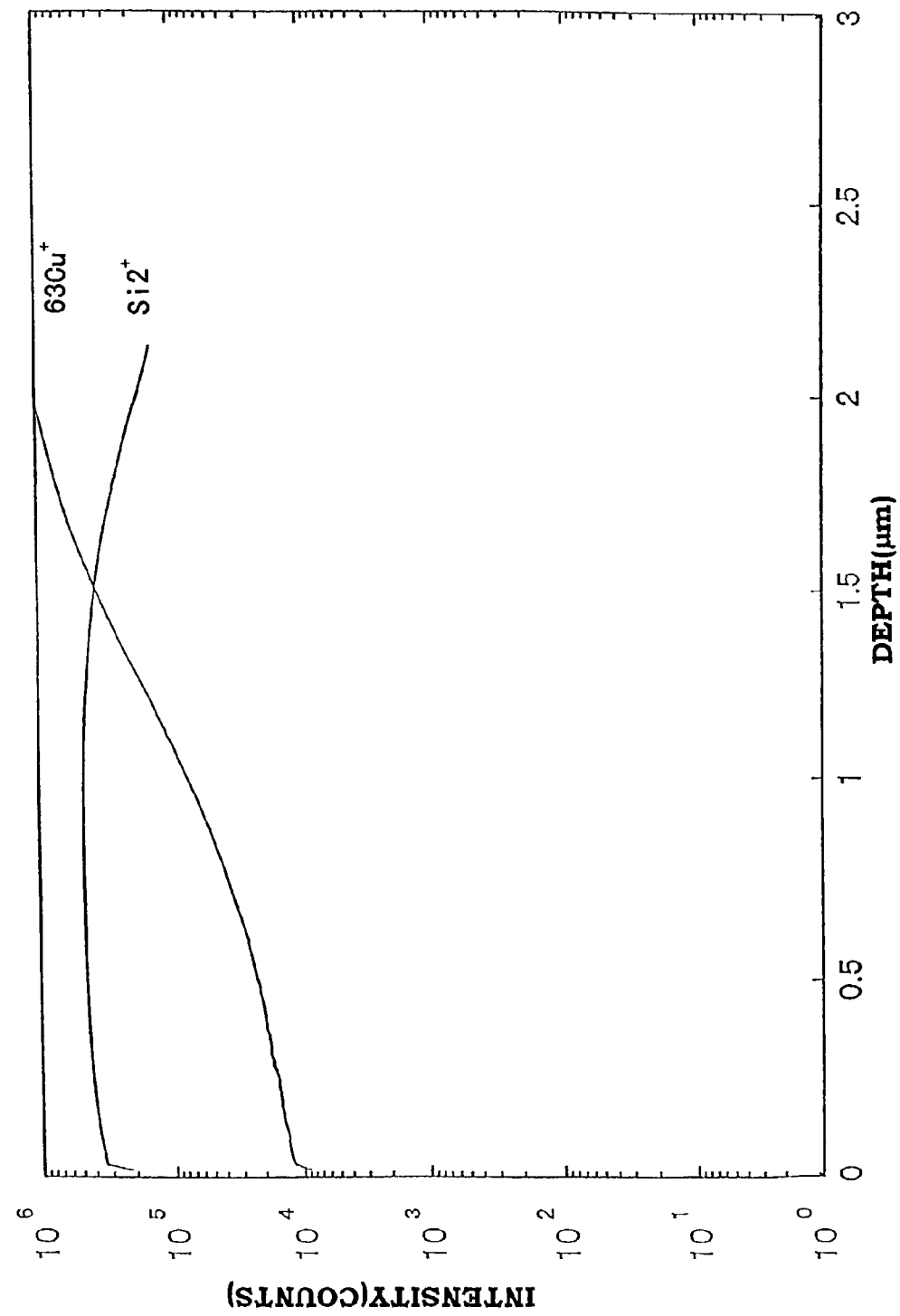
FIG. 17 is a graphical representation illustrating concentration profiles of constituent elements in a silicon thin film of an electrode a6 in accordance with the present invention along the depth of the film.

FIG. 17 is a graph showing concentration profiles of constituent elements along the thickness of the silicon thin film in the electrode a6. The concentration profiles of constituent elements were obtained via measurement of concentrations of copper ($^{63}Cu^+$) and silicon ($Si^{2+}$) by SIMS using $O_2^+$ as a sputtering source. In FIG. 17, the abscissa indicates a depth (μm) from a surface of the silicon thin film and the ordinate indicates an intensity (count) of each consituent element.

As apparent from FIG. 17, a constituent element of the current collector, copper (Cu), is found to diffuse in the silicon thin film at locations adjacent to the current collector. The copper (Cu) concentration decreases at a location closer to the surface of the silicon thin film. The copper (Cu) concentration is also found to vary in a continuous fashion. This demonstrates that a solid solution of silicon and copper, instead of an intermetallic compound thereof, is formed in the copper(Cu)-diffused region.

In view of the previous discussion, the following is very likely to explain a mechanism whereby the gaps are formed in the silicon thin film to extend in its thickness direction as it expands and shrinks during charge and discharge. That is, a stress caused by expansion or shrinkage in volume of the silicon thin film concentrates at valleys of the irregularities on the silicon thin film surface, as previously explained by referring to FIG. 10. Also, in the silicon thin film, there initially exists low-density regions which are relatively low in mechanical strength, extending from the valleys toward the current collector. As the result of the above-mentioned situations, the gaps (spaces) are likely to be formed along these low-density regions.

Also, as shown in FIG. 17, the diffusion of copper, a constituent element of the current collector, into the silicon thin film creates a concentration gradient of copper therein, so that the copper concentration is higher at a location closer to the current collector and lower at a location closer to the surface of the silicon thin film. Accordingly, a higher concentration of copper nonreactive with lithium and a lower concentration of silicon reactive with lithium exist at a location closer to the current collector. In the vicinity of the current collector, the silicon thin film is believed to store and release less lithium, undergo less expansion and shrinkage, and thus produce a lower level of stress which leads to the reduced formation of the gaps (spaces) which may occasion separation or removal of the silicon thin film from the current collector. As a result, the bottoms of the columnar portions of the silicon thin film can be kept adherent to the current collector.

The silicon thin film divided by such gaps into columns keeps a strong adhesion to the current collector even during charge-discharge cycles. Also, the spaces provided to surround the columnar portions serve to relax the stress caused by expansion and shrinkage of the thin film that occur with charge-discharge cycling. These are believed to be contributors to excellent charge-discharge cycle characteristics.

Experiment 4

Fabrication of Electrode a7

An electrolytic copper foil similar to that for use in the fabrication of the electrode a3 was used for a current collector as a substrate. An amorphous germanium thin film (about 2 μm thick) was formed on this copper foil by an RF sputtering technique to fabricate an electrode a7.

The thin film was formed using germanium as a target, at a sputtering gas (Ar) flow rate of 100 sccm, an ambient substrate temperature (not heated), a reaction pressure of 0.1 Pa, and 200 W RF power.

The resulting germanium thin film was analyzed by Raman spectroscopy which detected the presence of a peak around 274 $cm^{-1}$ and the absence of a peak around 300 $cm^{-1}$. This revealed an amorphous nature of the germanium thin film.

(Fabrication of Electrode a8)

An amorphous germanium thin film (about 2 μm thick) was formed on an electrolytic copper foil, similar in type to the current collector of the electrode a7, by using a vapor evaporation technique to fabricate an electrode a8.

Figure 18:
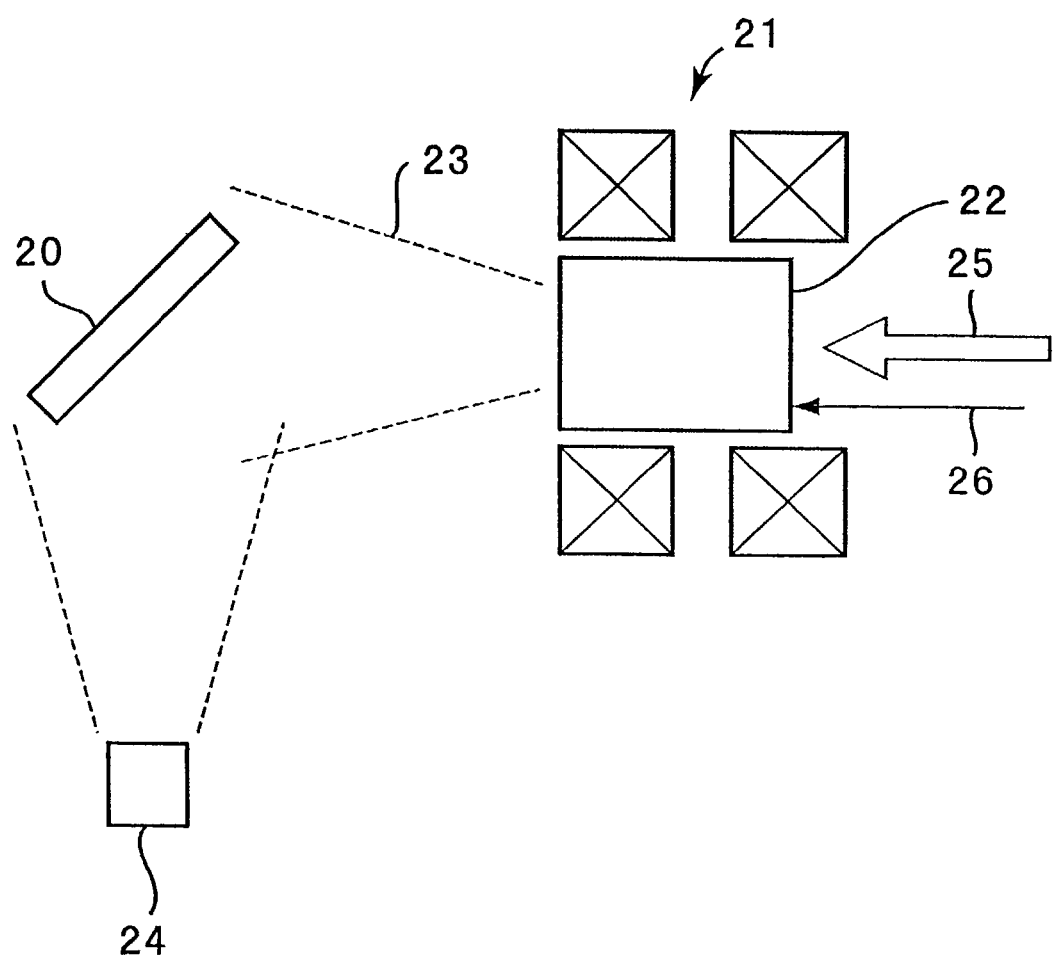
FIG. 18 is a schematic view, showing a construction of an apparatus which is employed when a thin film is formed by a vacuum vapor evaporation technique in examples of the present invention.

Specifically, the germanium thin film was deposited on the substrate by utilizing an apparatus of the construction shown in FIG. 18. Referring to FIG. 18, an ECR plasma source 21 includes a plasma generation chamber 22 to which a microwave power 25 and an Ar gas 26 are supplied. An Ar plasma is generated when the microwave power 25 is supplied to the plasma generation chamber 22. This Ar plasma 23 is directed to exit from the plasma generation chamber 22 and bombard a substrate 20. The germanium thin film can be deposited on the substrate 20 by utilizing an electron beam from an electron beam (EB) gun disposed below the substrate 20.

The electrolytic copper foil substrate was pretreated by Ar plasma irradiation before the germanium thin film was deposited thereon. A degree of vacuum within the reaction chamber was adjusted to about 0.05 Pa (about $5 \times 10^{-4}$ Torr). The substrate was exposed to the Ar plasma under conditions of an Ar gas flow rate of 40 sccm and a supplied microwave power of 200 W. During the Ar plasma irradiation, an bias voltage of −100 V was applied to the substrate. The pretreatment was accomplished by exposing the substrate to the Ar plasma for 15 minutes.

Next, the germanium thin film was deposited at a deposition rate of 1 nm/sec (10 Å/sec) using an electron beam gun. The substrate temperature was ambient temperature (not heated).

The resulting germanium thin film was analyzed by Raman spectroscopy which revealed an amorphous nature of the germanium thin film, as similar to the electrode a7.

(Fabrication of Electrode b2)

80 parts by weight of germanium powder with a mean particle diameter of 10 μm, 10 parts by weight of acetylene black as an electroconductive material, and 10 parts by weight of polytetrafluoroethylene as a binder were mixed. This mixture was pressed in a 17 mm diameter mold to fabricate a pellet-form electrode b2.

(Construction of Batteries)

The procedure of Experiment was repeated, except that the above-fabricated electrodes a7, a8 and b2 were used for the negative electrode, to construct batteries A7, A8 and B2.

(Evaluation of Charge-Discharge Cycle Characteristics)

Each battery was charged at a current of 0.1 mA at 25° C. to 4.2 V, and then discharged to 2.75 V. This standard charge-discharge cycling was repeated to measure a capacity retention rate on the 10th cycle. The measurement results are given in Table 5.

TABLE 5

| Battery | 10th-Cycle Capacity Retention Rate |
| --- | --- |
| A7 | 96% |
| A8 | 93% |
| B2 | 39% |

As apparent from Table 5, the batteries A7 and A8 using the electrodes in accordance with this invention, i.e., the electrodes incorporating the germanium thin film formed on the current collector, for the negative electrode exhibit markedly improved capacity retention rates compared to the battery B2 using the germanium powder for the negative electrode.

(Observation with Electron Microscope)

Figure 19:
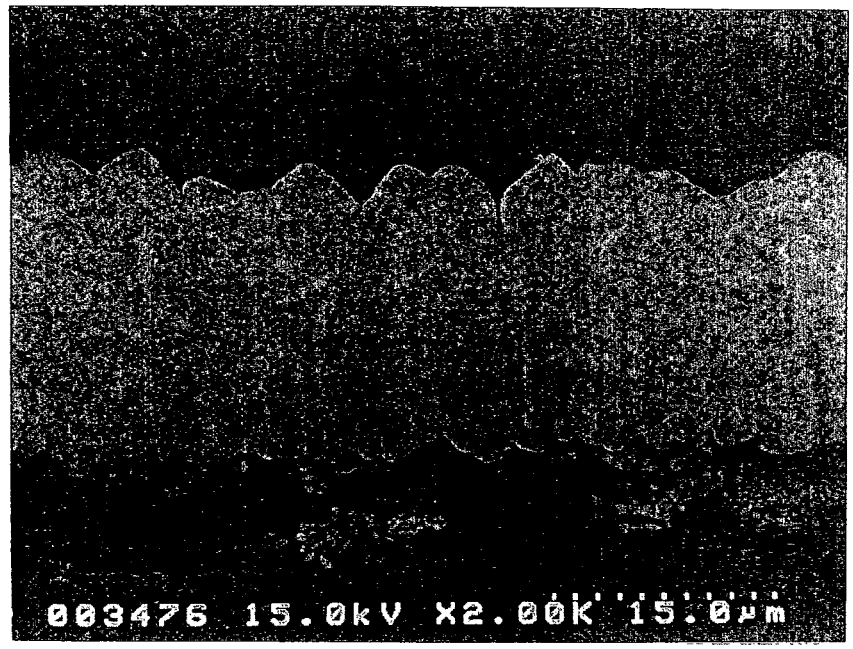
FIG. 19 is a photomicrograph (at a magnification of 2,000×) taken using a scanning electron microscope, showing an electrode a7 in accordance with the present invention in its state before charge and discharge.
Figure 20:
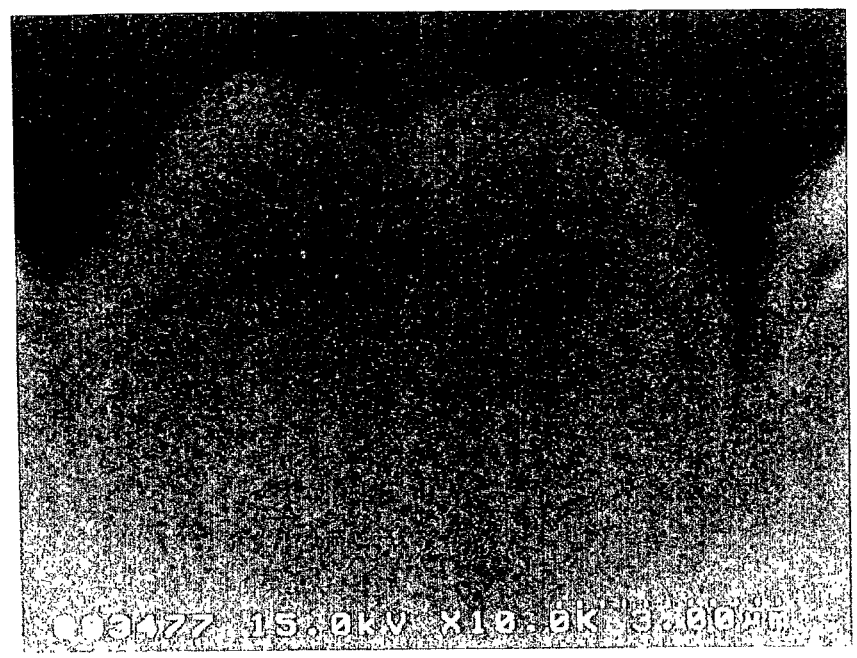
FIG. 20 is a photomicrograph (at a magnification of 10,000×) taken using a scanning electron microscope, showing the electrode a7 in accordance with the present invention in its state before charge and discharge.

FIGS. 19 and 20 are photomicrographs (reflection electron images) taken with a scanning electron microscope, each showing a section of the electrode a7 in its state before being charged and discharged. FIGS. 19 and 20 were taken at magnifications of 2,000× and 10,000×, respectively.

Each electrode was resin embedded and then sliced to provide a sample. The embedding resin is observed as layers located in upper and lower end portions of FIG. 19 and in an upper end portion of FIG. 20.

In FIGS. 19 and 20, the copper foil and the germanium thin film appear lightened relative to the rest. A thin layer overlying the copper foil is the germanium thin film. Irregularities are defined on a surface of the copper foil. Similar irregularities are also found on a surface of the germanium thin film. This suggests that the irregularities on the germanium thin film surface were formed to conform in shape to those defined on the copper foil surface.

In FIG. 20, there is observed a dark portion that is located in a germanium thin film region overlying a leftmost valley of the copper foil and extends in a thickness direction of the thin film. This portion is very likely to indicate a region of low density, i.e., a low-density region of the germanium thin film.

Figure 21:
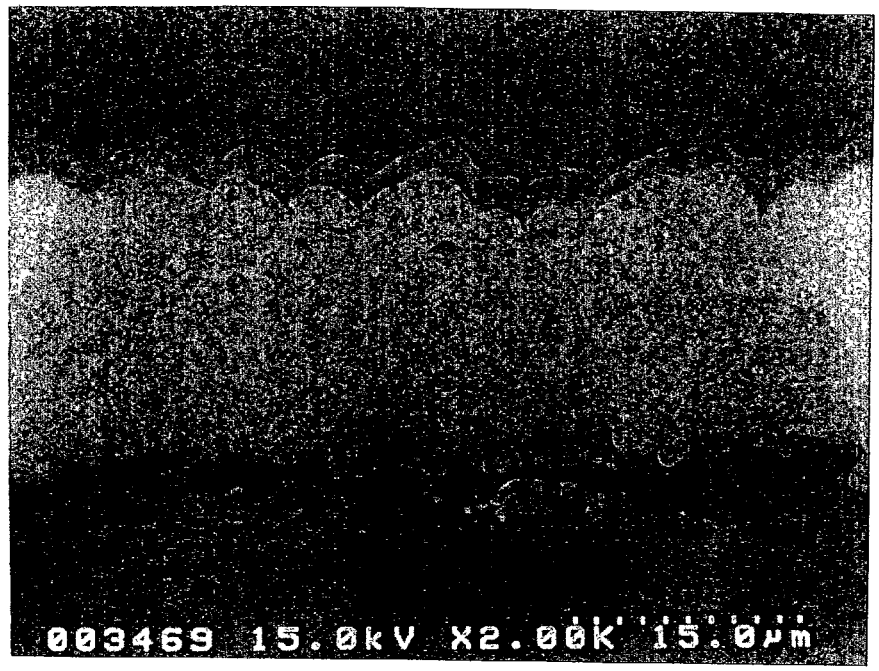
FIG. 21 is a photomicrograph (at a magnification of 2,000×) taken using a scanning electron microscope, showing an electrode a8 in accordance with the present invention in its state before charge and discharge.
Figure 22:
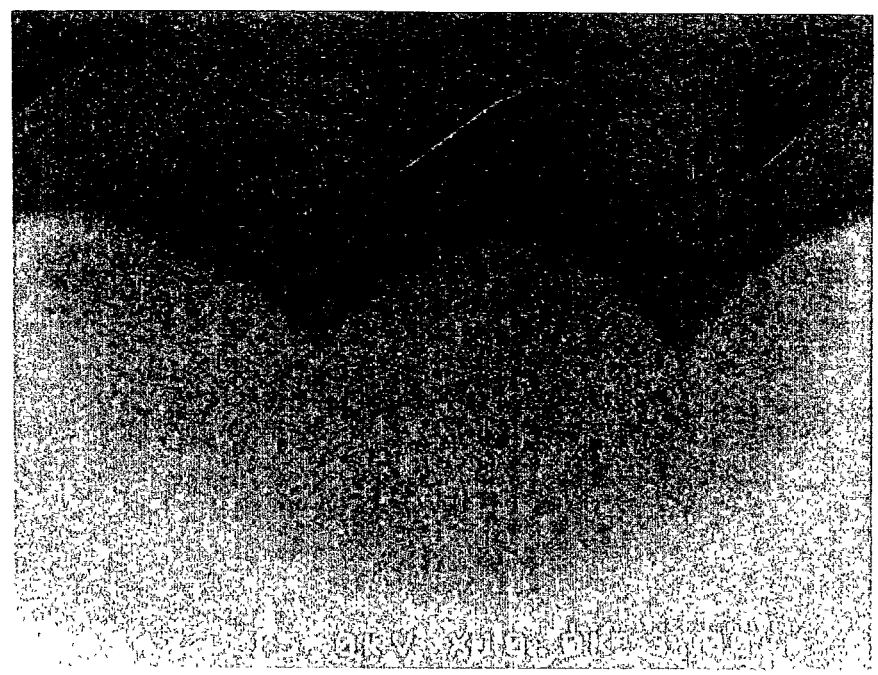
FIG. 22 is a photomicrograph (at a magnification of 10,000×) taken using a scanning electron microscope, showing the electrode a8 in accordance with the present invention in its state before charge and discharge.

FIGS. 21 and 22 are photomicrographs (reflection electron images) taken with a scanning electron microscope, each showing a section of the electrode a8 in its state before being charged and discharged. FIGS. 21 and 22 are taken at magnifications of 2,000× and 10,000×, respectively. Like the electrode a7 shown in FIGS. 19 and 20, a sample of this electrode is embedded in a resin.

In FIGS. 21 and 22, a lightened portion indicates a copper foil and a slightly darker portion carried thereon is a germanium thin film (about 2 μm thick). Irregularities are defined on both surfaces of the germanium thin film and the copper foil of the electrode a8, as analogous to the electrode a7.

Figure 23:
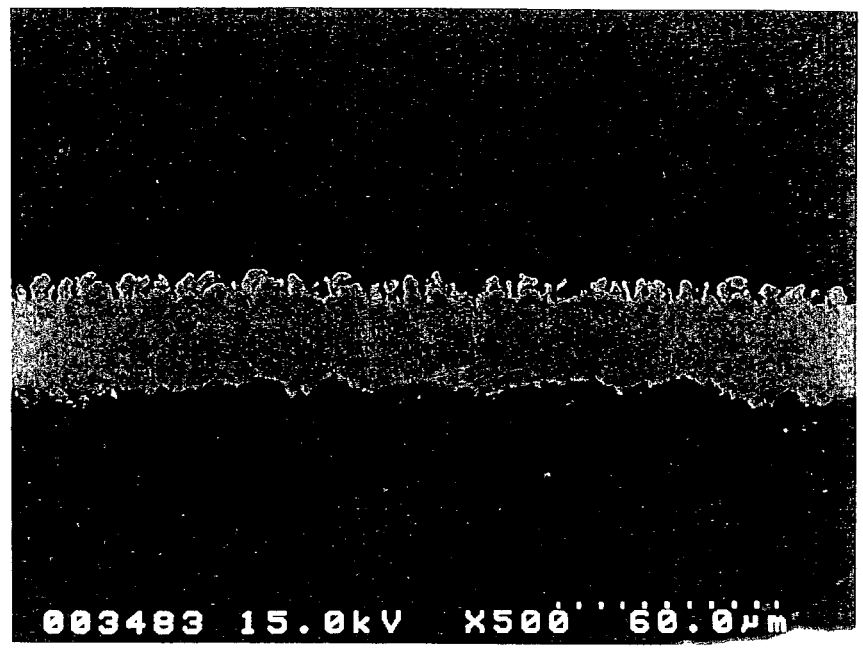
FIG. 23 is a photomicrograph (at a magnification of 500×) taken using a scanning electron microscope, showing the electrode a7 in accordance with the present invention in its state after charges and discharges.
Figure 24:
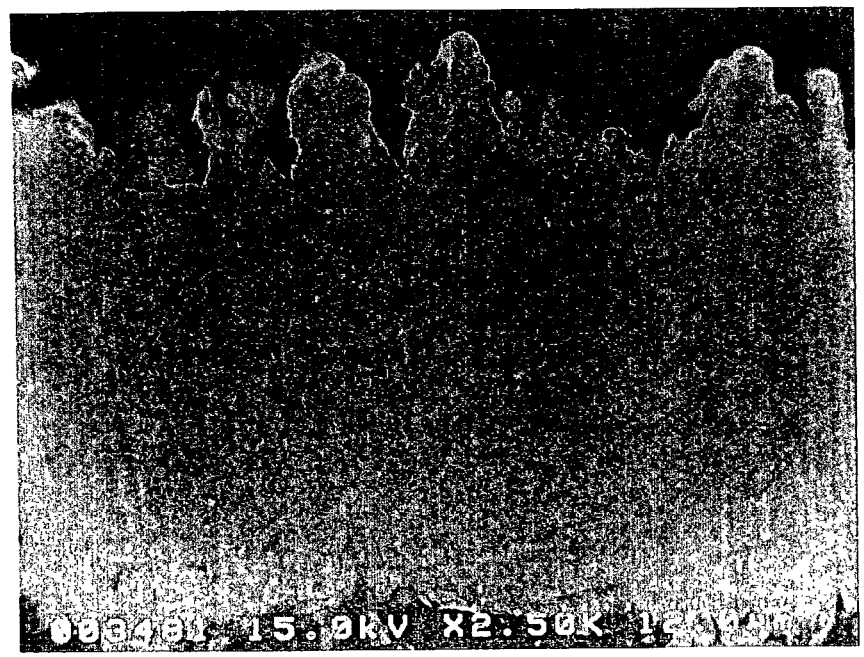
FIG. 24 is a photomicrograph (at a magnification of 2,500×) taken using a scanning electron microscope, showing the electrode a7 in accordance with the present invention in its state after charges and discharges.
Figure 25:
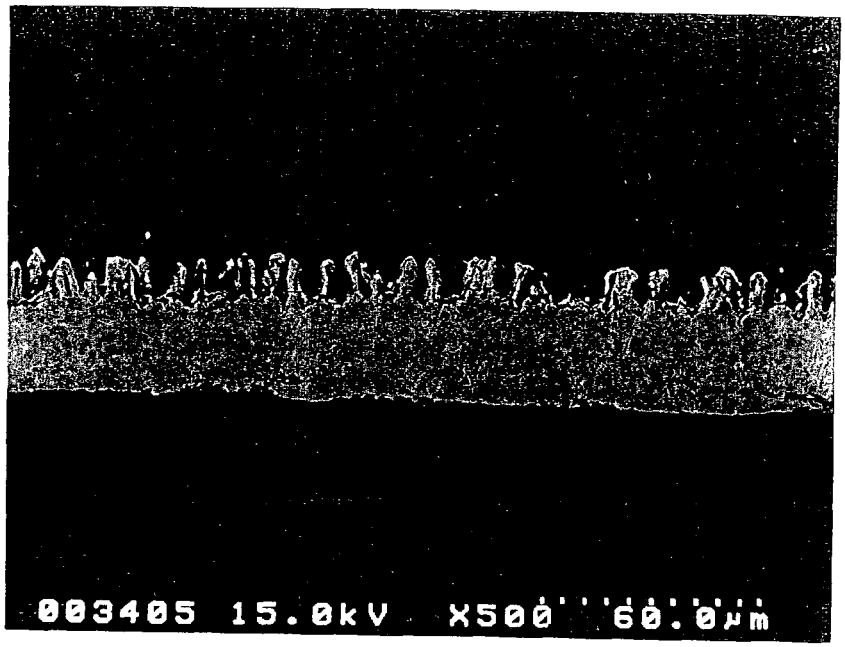
FIG. 25 is a photomicrograph (at a magnification of 500×) taken using a scanning electron microscope, showing the electrode a8 in accordance with the present invention in its state after charges and discharges.
Figure 26:
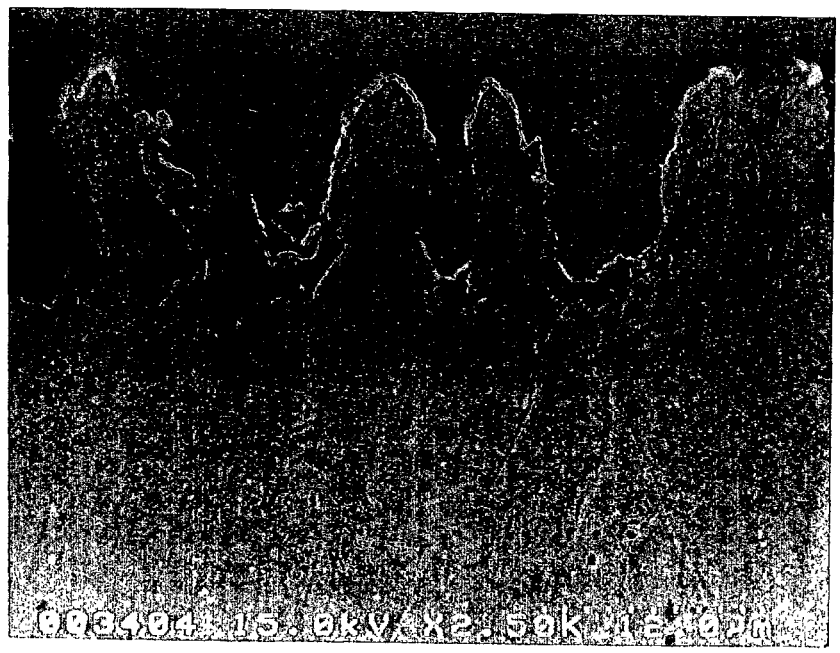
FIG. 26 is a photomicrograph (at a magnification of 2,500×) taken using a scanning electron microscope, showing the electrode a8 in accordance with the present invention in its state after charges and discharges.

FIGS. 23 and 24 are photomicrographs (reflection electron images) taken with a scanning electron microscope, each showing a section of the electrode a7 removed from the battery A7 after 10 cycles. FIGS. 25 and 26 are photo-micrographs (reflection electron images) taken with a scanning electron microscope, each showing a section of the electrode a8 removed from the battery A8 after 10 cycles. In either case, the electrode was resin embedded and then sliced to provide a sample. FIGS. 23 and 25 are both taken at a magnification of 500×. FIGS. 24 and 26 are both taken at a magnification of 2,500×.

In FIGS. 23-26, a portion which appears white on the surface of the germanium thin film is gold coated thereon before it is embedded in a resin. The coating of gold is provided to prevent any reaction which may occur between the germanium thin film and the resin and also define a clear boundary therebetween.

As can be clearly seen from FIGS. 23-26, charge-discharge cycling causes formation of gaps which extend in a thickness direction of the germanium thin film and divide the thin film into columns, as similar to the case of the silicon thin film. Although a small difference in contrast between the copper foil, as a current collector, and the germanium thin film makes it difficult to distinguish a boundary therebetween, the careful observation reveals the presence of columnar portions of the germanium thin film over projections of the current collector and thus good adhesion of the germanium thin film to the current collector.

Unlike the case of silicon thin film, laterally-extending gaps are also observed in the germanium thin film. It is very likely, however, that such gaps were formed when the germanium thin film was polished before proceeding to sectional observation.

Also, the width of a gap (space) between neighboring columnar portions is found to be larger in the germanium thin film than in the silicon thin film. After charge-discharge cycling, the height of the columnar portions measured about 6 μm, which is about three times the initial film thickness of the germanium thin film, 2 μm, before the charge-discharge cycling. This is considered to indicate that when the thin film shrinks on discharge after it has expanded due to storage of lithium during charge, the shrinkage occurs mainly in a lateral direction, i.e., in a planar direction. It is accordingly believed that the wide gaps (spaces) between the columnar portions result from a small percent shrinkage of the germanium thin film in its thickness direction.

Figure 27:
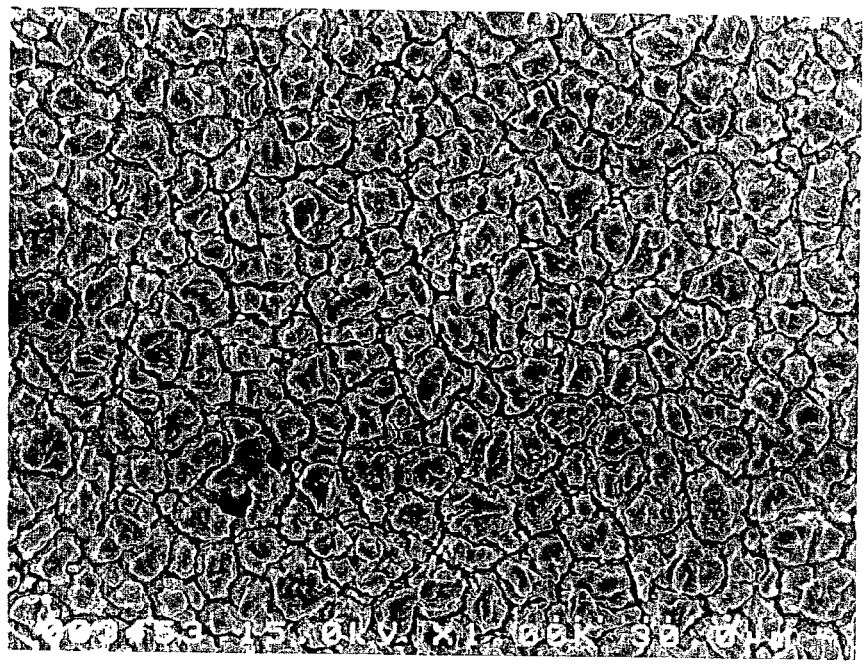
FIG. 27 is a photomicrograph (at a magnification of 1,000×) taken using a scanning electron microscope, showing a germanium thin film of the electrode a7 in accordance with the present invention in its state after charges and discharges, when viewed from above.
Figure 28:
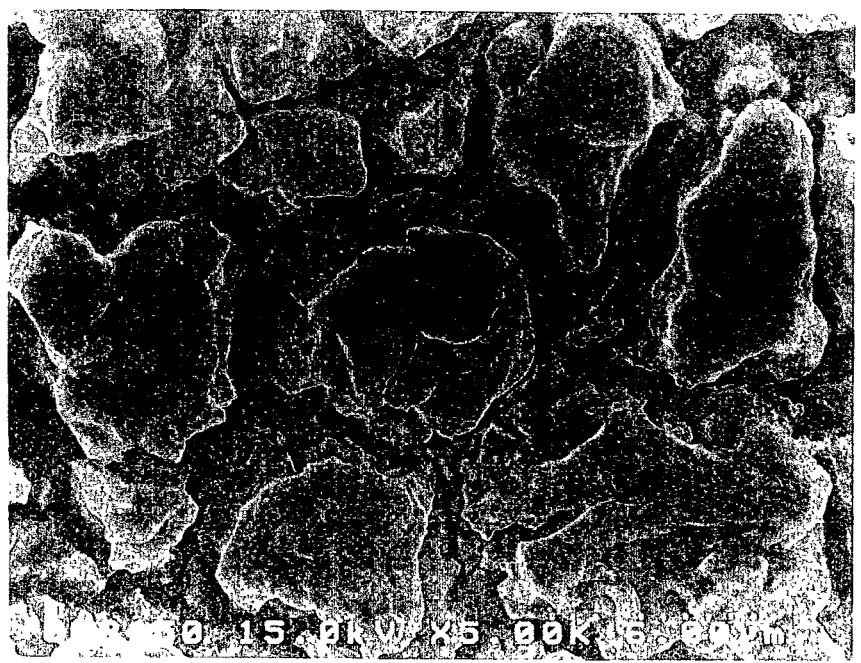
FIG. 28 is a photomicrograph (at a magnification of 5,000×) taken using a scanning electron microscope, showing a germanium thin film of the electrode a7 in accordance with the present invention in its state after charges and discharges, when viewed from above.
Figure 29:
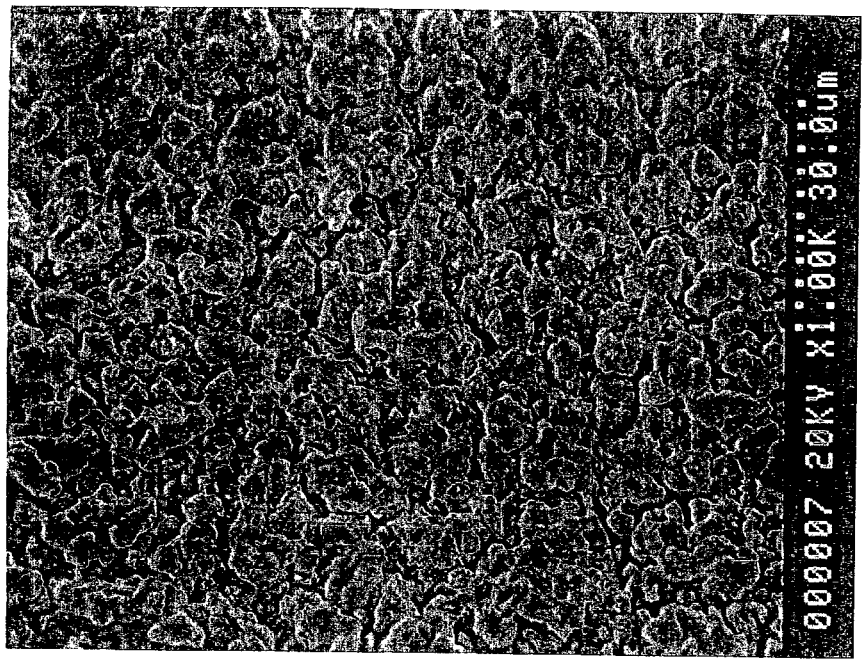
FIG. 29 is a photomicrograph (at a magnification of 1,000×) taken using a scanning electron microscope, showing a germanium thin film of the electrode a7 in accordance with the present invention in its state after charges and discharges, when viewed from a slight angle.
Figure 30:
FIG. 30 is a photomicrograph (at a magnification of 5,000×) taken using a scanning electron microscope, showing a germanium thin film of the electrode a7 in accordance with the present invention in its state after charges and discharges, when viewed from a slight angle.

FIGS. 27 and 28 are photomicrographs (secondary electron images) taken with a scanning electron microscope, each showing a germanium thin film of the electrode a7 in its state after charges and discharges, when observed from above. FIGS. 27 and 28 are taken at magnifications of 1,000× and 5,000×, respectively. FIGS. 29 and 30 are photomicrographs (secondary electron images) taken with a scanning electron microscope, each showing the germanium thin film of the electrode a7 in its state after charges and discharges, when observed at a slight angle. FIGS. 29 and 30 are taken at magnifications of 1,000× and 5,000×, respectively.

Figure 31:
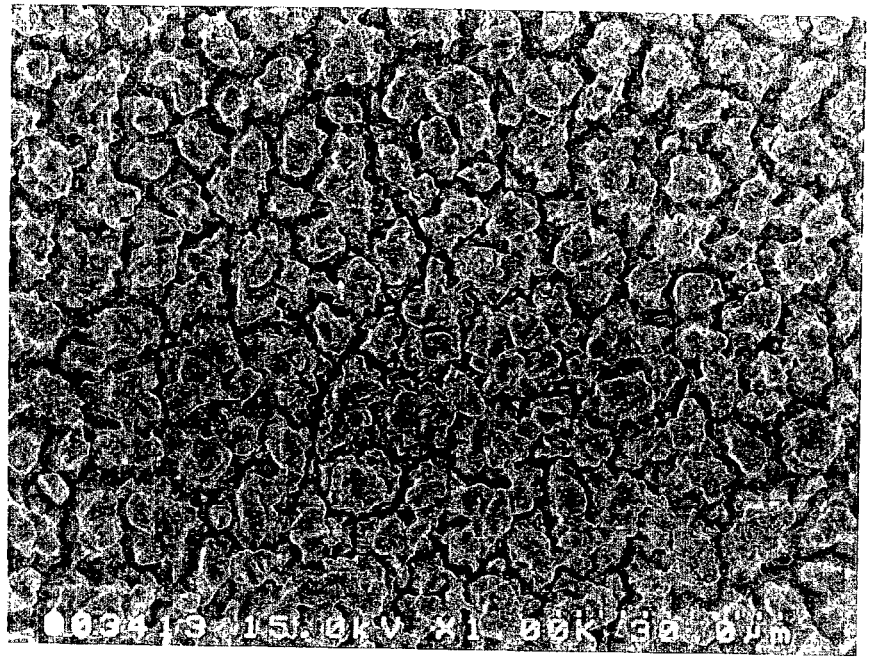
FIG. 31 is a photomicrograph (at a magnification of 1,000×) taken using a scanning electron microscope, showing a germanium thin film of the electrode a8 in accordance with the present invention in its state after charges and discharges, when viewed from above.
Figure 32:
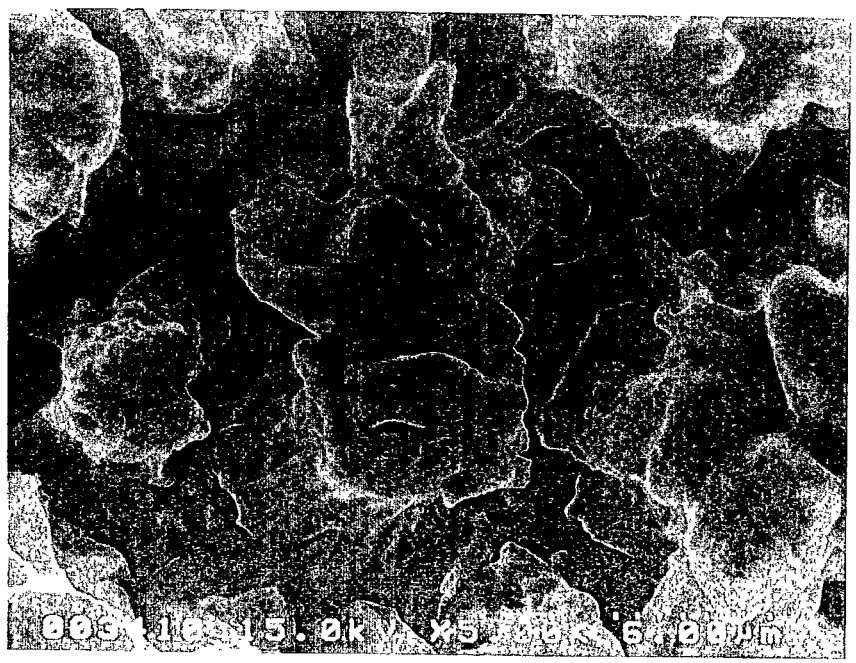
FIG. 32 is a photomicrograph (at a magnification of 5,000×) taken using a scanning electron microscope, showing a germanium thin film of the electrode a8 in accordance with the present invention in its state after charges and discharges, when viewed from above.
Figure 33:
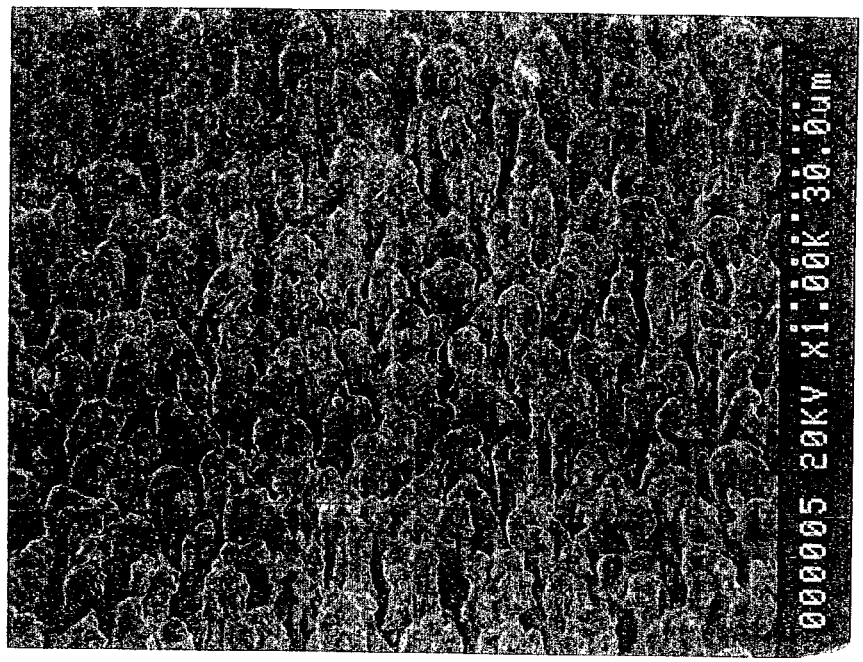
FIG. 33 is a photomicrograph (at a magnification of 1,000×) taken using a scanning electron microscope, showing a germanium thin film of the electrode a8 in accordance with the present invention in its state after charges and discharges, when viewed from a slight angle.
Figure 34:
FIG. 34 is a photomicrograph (at a magnification of 5,000×) taken using a scanning electron microscope, showing a germanium thin film of the electrode a8 in accordance with the present invention in its state after charges and discharges, when viewed from a slight angle.

FIGS. 31 and 32 are photomicrographs (secondary electron images) taken with a scanning electron microscope, each showing a germanium thin film of the electrode a8 in its state after charges and discharges, when observed from above. FIGS. 31 and 32 are taken at magnifications of 1,000× and 5,000×, respectively. FIGS. 33 and 34 are photomicrographs (secondary electron images) taken with a scanning electron microscope, each showing the germanium thin film of the electrode a8 in its state after charges and discharges, when observed at a slight angle. FIGS. 33 and 34 are taken at magnifications of 1,000× and 5,000×, respectively.

As shown in FIGS. 27-34, gaps (spaces) are formed in such a fashion to surround the columnar portions of the germanium thin film to thereby define spaces between the neighboring columnar portions. It is believed that these spaces serve to relax the stress caused by expansion and shrinkage of the active material during charge and discharge, as also described in the previous case of silicon thin film.

Figure 35:
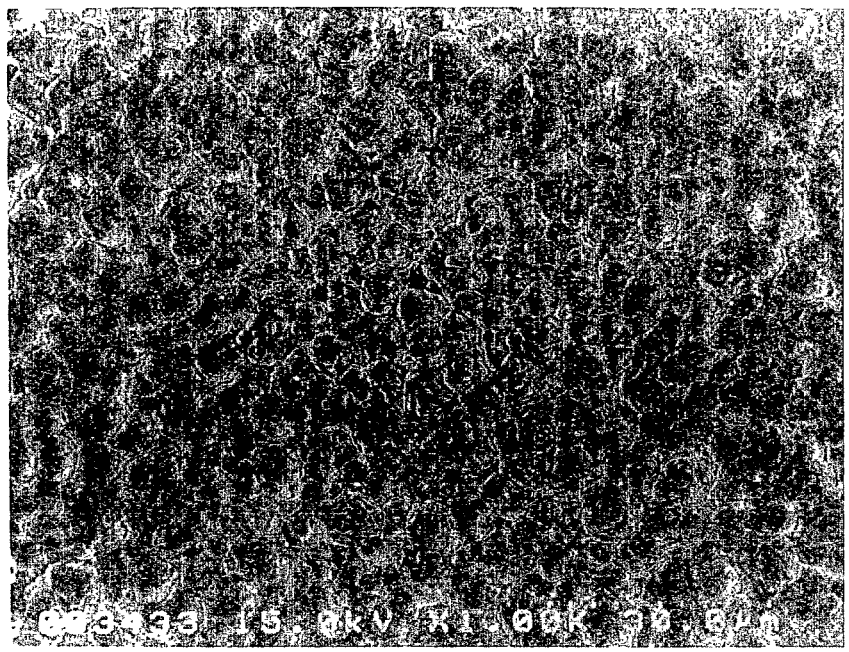
FIG. 35 is a photomicrograph (at a magnification of 1,000×) taken using a scanning electron microscope, showing a germanium thin film of the electrode a7 in accordance with the present invention in its state before charge and discharge, when viewed from above.
Figure 36:
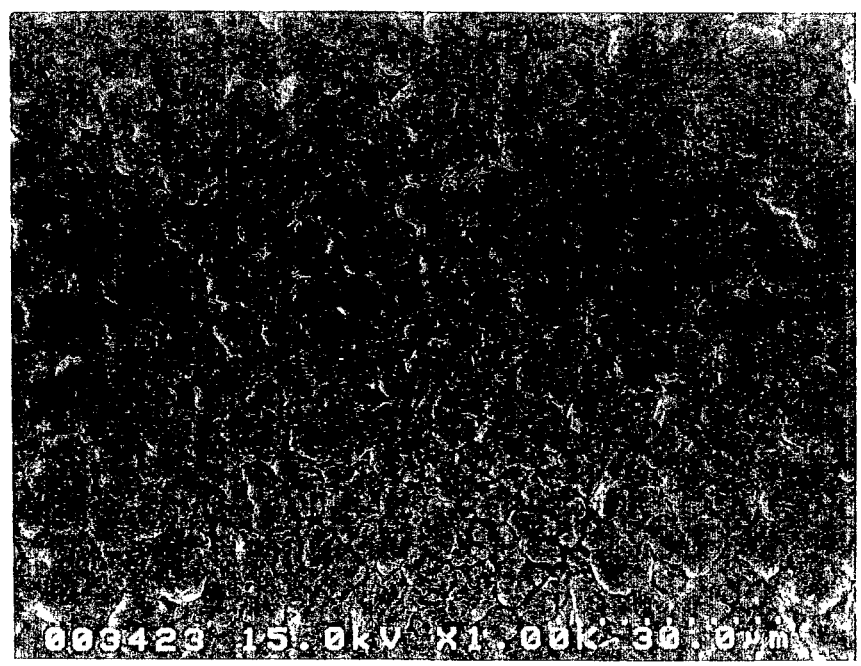
FIG. 36 is a photomicrograph (at a magnification of 1,000×) taken using a scanning electron microscope, showing a germanium thin film of the electrode a8 in accordance with the present invention in its state before charge and discharge, when viewed from above.

FIG. 35 is a photomicrograph (secondary electron images) taken with a scanning electron microscope, showing a surface of the germanium thin film of the electrode a7 in its state before charge and discharge, when observed from above. FIG. 36 is a photomicrograph (secondary electron images) taken with a scanning electron microscope, showing a surface of the germanium thin film of the electrode a8 in its state before charge and discharge, when observed from above. FIGS. 35 and 36 are both taken at a magnification of 1,000×.

As shown in FIGS. 35 and 36, the germanium thin film has irregularities on its surface that follow the profile of those defined on the underlying electrolytic copper foil. The valleys of the germanium thin film are connected to each other like a network. It is understood that the gaps extend along the depth of such valleys to define columnar portions in the germanium thin film.

(SIMS Analysis of Concentration Profile Along Depth)

Figure 37:
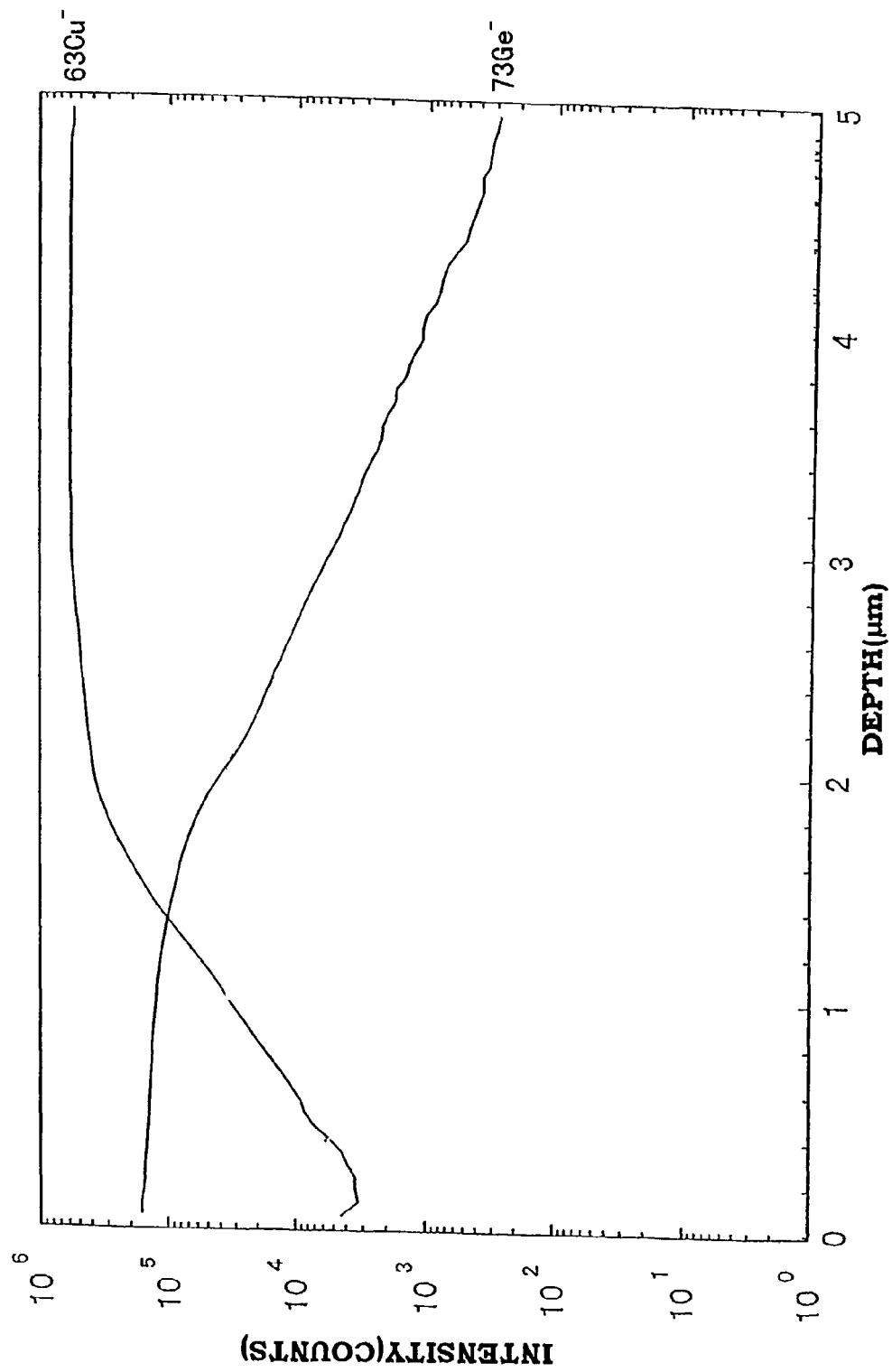
FIG. 37 is a graphical representation illustrating concentration profiles of constituent elements in a germanium thin film of the electrode a7 in accordance with the present invention along the depth of the film.
Figure 38:
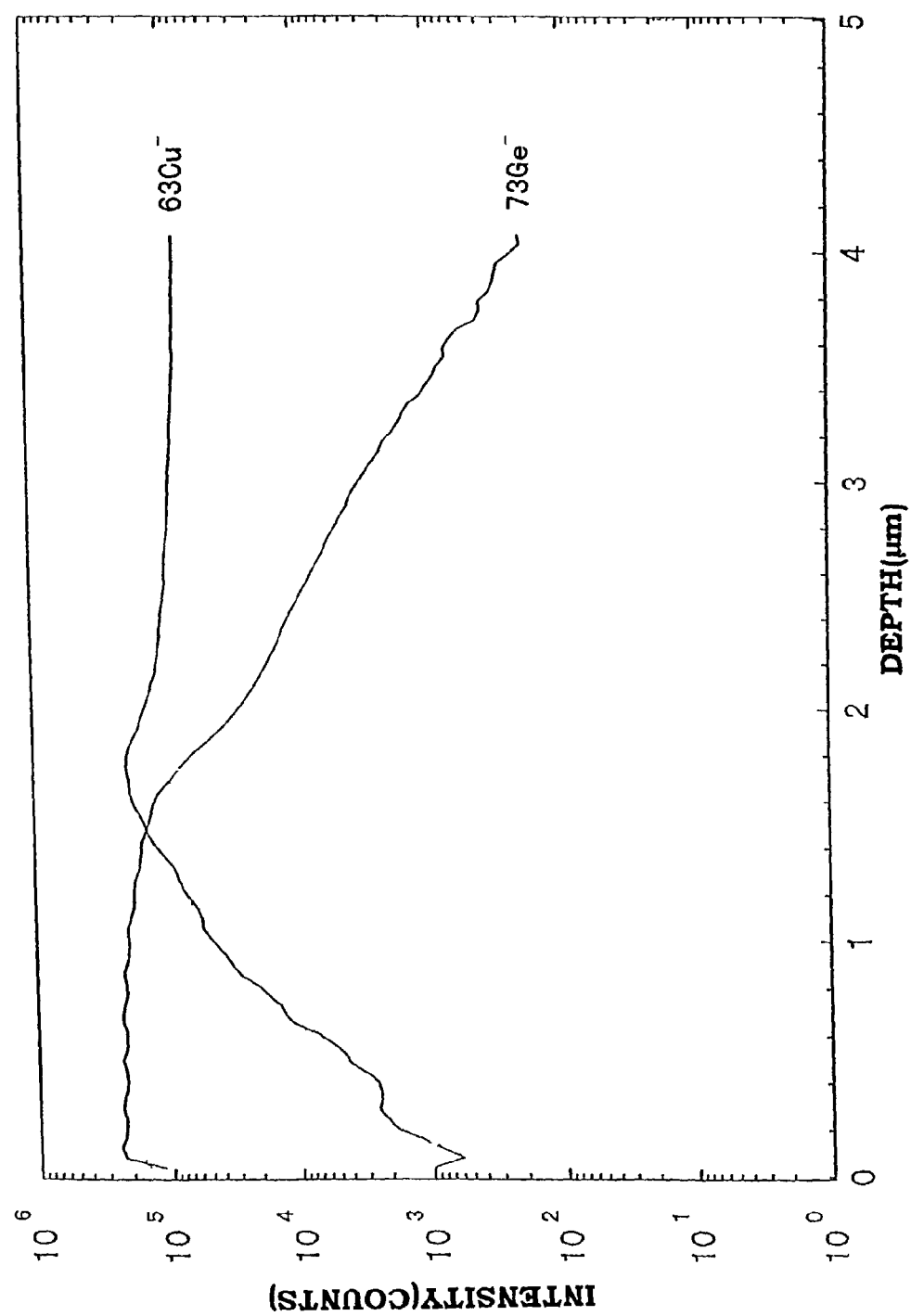
FIG. 38 is a graphical representation, illustrating concentration profiles of constituent elements in a germanium thin film in the electrode a8 in accordance with the present invention along the depth of the film.

FIG. 37 is a graphical representation illustrating concentration profiles of constituent elements in the electrode a7 along its depth before it is incorporated in a battery, i.e., before charge and discharge. FIG. 38 is a graphical representation illustrating concentration profiles of constituent elements in the electrode a8 along its depth before charge and discharge. The concentration profiles of constituent elements were obtained by a secondary ion mass spectrometry (SIMS) wherein copper ($^{63}Cu^-$) and germanium ($^{73}Ge^-$) concentrations were measured along the depth from a surface of the thin film using $O_2$ as a sputtering source. The abscissa indicates a depth (μm) from a surface of the germanium thin film and the ordinate indicates an intensity (count) of each consituent element.

As can be clearly seen from FIGS. 37 and 38, copper (Cu), as a current collector constituent, diffuses into the germanium thin film in the vicinity of the current collector and shows a lower concentration at a location closer to the surface of the germanium thin film.

As discussed above, the germanium thin film contains a current collector constituent, copper, diffused therein, has a higher copper concentration in the vicinity of the current collector, and has a concentration gradient such that a copper concentration becomes lower at a location closer to its surface. Hence, the germanium thin film in the vicinity of the current collector contains a higher concentration of copper unreactive with lithium and a lower concentration of germanium reactive with lithium. In the vicinity of the current collector, the germanium thin film is thus believed to store and release less lithium, undergo less expansion and shrinkage, and produce a lower level of stress. This probably results in the reduced formation of gaps (spaces) which may cause separation or removal of the gemanium thin film from the current collector, so that the bottoms of the columnar portions of the germanium thin film can be kept adhered to the current collector.

As stated above, the germanium thin film in conditions of being divided in columns maintains strong adhesion to the current collector even during charge-discharge cycling. Also, the gaps formed in a fashion to surround the colomnar portions serve to relax the stress caused by expansion and shrinkage during charge-discharge cycles. The excellent charge-discharge cycle characteristics are thus obtained.

Experiment 5

Fabrication of Electrode a9

An electrolytic copper foil (18 μm thick) was used for a current collector as a substrate. A silicon thin film was formed on this electrolytic copper foil by an RF sputtering technique. The sputtering was effected at a sputtering gas (Ar) flow rate of 100 sccm, an ambient substrate temperature (not heated), a reaction pressure of 0.1 Pa ($1.0 \times 10^{-3}$ Torr) and a 200 W RF power. The silicon thin film was deposited to a thickness of about 2 μm.

The resulting silicon thin film was analyzed by Raman spectroscopy which detected the presence of a peak around 480 $cm^{-1}$ and the absence of a peak around 520 $cm^{-1}$. This reveals an amorphous nature of the silicon thin film.

The electrolytic copper foil after silicon thin film deposition thereon was cut into a 2 cm×2 cm size to prepare an electrode a9.

The surface roughness Ra and the mean spacing S of the electrolytic copper foil used were measured using a stylus profiler Dektat$^3$ST (available from ULVAC Inc.) with a scanning distance of 2.0 mm. The surface roughness Ra and the mean spacing S were determined to be 0.188 μm and 11 μm, respectively.

(Fabrication of Electrode a10)

An electrolytic copper foil similar to that used in the fabrication of the electrode a9 was used for a current collector as a substrate. A silicon thin film was formed on the electrolytic copper foil under the same conditions as used in the fabrication of the electrode a1 of Experiment 1 to a thickness of about 2 μm. The procedure used to prepare the electrode a9 was followed to prepare an electrode a10.

The resulting silicon thin film was analyzed by Raman spectroscopy which detected the presence of peaks around 480 $cm^{-1}$ and 520 $cm^{-1}$. This reveals a microcrystalline nature of the silicon thin film.

(Fabrication of Comparative Electrode b3)

A rolled copper foil for use in the above Experiment 1 was utilized for a current collector as a substrate. The procedure used to fabricate the electrode a9 was followed to form an amorphous silicon thin film (about 2 μm thick) on the rolled copper foil by an RF sputtering technique.

The resulting amorphous silicon thin film was subjected to one-hour annealing at 650° C. The annealed silicon thin film was then analyzed by Raman spectroscopy which revealed disappearance of a peak around 480 $cm^{-1}$ and detected a sole peak around 520 $cm^{-1}$. This demonstrates that the annealing results in the formation of a polycrystalline silicon thin film.

The procedure used to prepare the electrode a9 was followed to prepare an electrode b3 from the polycrystalline silicon thin film formed on the rolled copper foil.

The above-described procedure was utilized to measure the surface roughness Ra and the mean spacing S for the rolled copper foil. The rolled copper foil exhibited the surface roughness Ra of 0.037 μm and the mean spacing S of 14 μm.

(Measurement of Charge-Discharge Characteristics)

Each of the above-fabricated electrodes a9, a10 and b3 was used as a work electrode. Metallic lithium was used for both a counter electrode and a reference electrode. Using these electrodes, experimental cells were constructed. The electrolyte solution was identical to that used in the above Experiment 1. In a single electrode cell, reduction of the work electrode is a charge reaction and oxidation thereof is a discharge reaction.

Each experimental cell was charged at a constant current of 0.5 mA at 25° C. until a potential relative to the reference electrode reached 0 V, and then discharged to 2 V. This was recorded as a unit charge-discharge cycle. Cycling was effected to measure 1st- and 5th-cycle discharge capacities and charge-discharge efficiencies. The results are given in Table 6.

TABLE 6

| | | | Electrode a9 | Electrode a10 | Electrode b3 |
|---|---|---|---|---|---|
| Substrate | | | Electrolytic Copper Foil | Electrolytic Copper Foil | Rolled Copper Foil |
| Thickness of Silicon Thin Film | | | 2 μm | 2 μm | 2 μm |
| Annealing | | | Absent | Absent | 650° C., 1 h |
| Crystallinity of Silicon Thin Film | | | Amorphous | Microcrystalline | Polycrystalline |
| Charge-Discharge Characteristics | 1st Cycle | Discharge Capacity (mAh/g) | 3980 | 4020 | 1978 |
| | | Charge-Discharge Efficiency (%) | 100 | 96 | 83 |
| | 5th Cycle | Discharge Capacity (mAh/g) | 3990 | 4020 | 731 |
| | | Charge-Discharge Efficiency (%) | 100 | 100 | 75 |

As apparent from the results shown in Table 6, the electrode a9 using the amorphous silicon thin film for the electrode active material and the electrode a10 using the microcrystalline silicon thin film for the electrode active material, in accordance with the present invention, exhibit higher discharge capacities and superior charge-discharge efficiencies even on the 5th cycle, relative to the comparative electrode b3.

Experiment 6

Examples 1-7 and Comparative Examples 1-2

Fabrication of Current Collector

Samples 1-4 specified in Table 7 were used for a current collector as a substrate. Sample 1 was similar to the rolled copper foil used for the current collector of the electrode b3. Samples 2-4 were prepared in accordance with the following procedure: A rolled copper foil was ground with a #100, #400 or #1000 emery paper to roughen its surface, washed with a purified water and then dried.

TABLE 7

| | Sample No. | | | |
|---|---|---|---|---|
| | 1 | 2 | 3 | 4 |
| Copper Foil Thickness (μm) | 18 | 18 | 18 | 18 |
| Surface Roughness Ra (μm) | 0.037 | 0.1 | 0.18 | 1 |

Each of the above copper foils was used as a substrate. A silicon thin film was deposited on the substrate under the conditions specified in Tables 8-10 by means of an RF argon sputtering apparatus. In Comparative Example 2, the deposited thin film was subsequently subjected to a heat treatment (annealing). In Examples 1-7 and Comparative Example 1, each substrate was pretreated prior to thin film deposition. The pretreatment was performed by generating an ECR plasma in a separately-installed plasma generator and directing the plasma to bombard the substrate for 10 minutes at a 200 W microwave power and an argon gas partial pressure of 0.06 Pa.

The nature of each silicon thin film was identified via analysis by Raman spectroscopy. The results are shown in Tables 8-10.

(Measurement of Charge-Discharge Characteristics)

The silicon-deposited copper foils obtained in Examples 1-7 and Comparative Examples 1-2 were cut into 2 cm×2 cm pieces and then utilized to construct experimental cells in the same manner as in the above Experiment 5. For each cell, the charge-discharge test was performed in the same manner as in the above Experiment 5 to measure 1st-, 5th- and 20th-cycle discharge capacities and charge-discharge efficiencies. The results are shown in Tables 8-10.

TABLE 8

| | | Ex. 1 | Ex. 2 | Ex. 3 | Ex. 4 |
|---|---|---|---|---|---|
| Substrate | Substrate type | Sample 2 | Sample 3 | Sample 4 | Sample 3 |
| | Surface Roughness Ra | 0.1 | 0.18 | 1 | 0.18 |
| | Substrate Thickness | 18 μm | 18 μm | 18 μm | 18 μm |
| Thin Film Forming Conditions | Thickness of Silicon Thin Film | 2 μm | 2 μm | 2 μm | 2 μm |
| | Film-Forming Process | Sputtering | Sputtering | Sputtering | Sputtering |
| | Sputtering Gas | Argon | Argon | Argon | Argon |
| | Ar Flow Rate | 100 sccm | 100 sccm | 100 sccm | 100 sccm |
| | Target | 99.999% Si Single Crystal | 99.999% Si Single Crystal | 99.999% Si Single Crystal | 99.999% Si Single Crystal |
| | Sputtering Atmosphere | 0.10 Pa | 0.10 Pa | 0.10 Pa | 0.10 Pa |
| | Sputtering Power | 200 W | 200 W | 200 W | 200 W |
| | Substrate Temperature | 20° C. | 20° C. | 20° C. | 200° C. |
| | Pretreatment | Present | Present | Present | Present |
| | Sputtering Time | 2 h | 2 h | 2 h | 2 h |

TABLE 8-continued

|  |  | Ex. 1 | Ex. 2 | Ex. 3 | Ex. 4 |
|---|---|---|---|---|---|
| Heat Treatment Conditions | Heat Treatment | Absent | Absent | Absent | Absent |
|  | Heat Treating Time | — | — | — | — |
| Identification of Crystallinity | Raman Peak at 480 cm$^{-1}$ | Present | Present | Present | Present |
|  | Raman Peak at 520 cm$^{-1}$ | Absent | Absent | Absent | Absent |
|  | Crystallinity | Amorphous | Amorphous | Amorphous | Amorphous |
| 1st Cycle | Discharge Capacity (mAh/g) | 3980 | 3978 | 3975 | 3980 |
|  | Charge-Discharge Efficiency (%) | 100 | 100 | 100 | 100 |
| 5th cycle | Discharge Capacity (mAh/g) | 3990 | 3981 | 3980 | 3990 |
|  | Charge-Discharge Efficiency (%) | 100 | 100 | 100 | 100 |
| 20th cycle | Discharge Capacity (mAh/g) | 3990 | 3980 | 3981 | 3990 |
|  | Charge-Discharge Efficiency (%) | 100 | 100 | 100 | 100 |

TABLE 9

|  |  | Ex. 5 | Ex. 6 | Ex. 7 |
|---|---|---|---|---|
| Substrate | Substrate type | Sample 3 | Sample 3 | Sample 3 |
|  | Surface Roughness Ra | 0.18 | 0.18 | 0.18 |
|  | Substrate Thickness | 18 μm | 18 μm | 18 μm |
| Thin Film Forming Conditions | Thickness of Silicon Thin Film | 2 μm | 2 μm | 2 μm |
|  | Film-Forming Process | Sputtering | Sputtering | Sputtering |
|  | Sputtering Gas | Argon | Argon | Argon |
|  | Ar Flow Rate | 100 sccm | 100 sccm | 100 sccm |
|  | Target | 99.999% Si Single Crystal | 99.999% Si Single Crystal | 99.999% Si Single Crystal |
|  | Sputtering Atmosphere | 0.10 Pa | 1.0 Pa | 10 Pa |
|  | Sputtering Power | 200 W | 200 W | 200 W |
|  | Substrate Temperature | 50° C. | 20° C. | 20° C. |
|  | Pretreatment | Present | Present | Present |
|  | Sputtering Time | 2 h | 1.5 h | 2.5 h |
| Heat Treatment Conditions | Heat Treatment | Absent | Absent | Absent |
|  | Heat Treating Time | — | — | — |
| Identification of Crystallinity | Raman Peak at 480 cm$^{-1}$ | Present | Present | Present |
|  | Raman Peak at 520 cm$^{-1}$ | Absent | Absent | Absent |
|  | Crystallinity | Amorphous | Amorphous | Amorphous |
| 1st Cycle | Discharge Capacity (mAh/g) | 4060 | 3585 | 2500 |
|  | Charge-Discharge Efficiency (%) | 100 | 100 | 100 |
| 5th cycle | Discharge Capacity (mAh/g) | 4060 | 3592 | 2505 |
|  | Charge-Discharge Efficiency (%) | 100 | 100 | 100 |
| 20th cycle | Discharge Capacity (mAh/g) | 4060 | 3590 | 2505 |
|  | Charge-Discharge Efficiency (%) | 100 | 100 | 100 |

TABLE 10

|  |  | Comp. Ex. 1 | Comp. Ex. 2 |
|---|---|---|---|
| Substrate | Substrate type | Sample 3 | Sample 1 |
|  | Surface Roughness Ra | 0.18 | 0.037 |
|  | Substrate Thickness | 10 μm | 18 μm |
| Thin Film Forming Conditions | Thickness of Silicon Thin Film | 2 μm | 2 μm |
|  | Film-Forming Process | Sputtering | Sputtering |
|  | Sputtering Gas | Argon | Argon |
|  | Ar Flow Rate | 100 sccm | 100 sccm |
|  | Target | 99.999% Si Single Crystal | 99.999% Si Single Crystal |
|  | Sputtering Atmosphere | 0.10 Pa | 0.10 Pa |
|  | Sputtering Power | 200 W | 200 W |
|  | Substrate Temperature | 450° C. | 20° C. |
|  | Pretreatment | Present | Absent |
|  | Sputtering Time | 2 h | 2 h |
| Heat Treatment Conditions | Heat Treatment | Absent | 650° C. |
|  | Heat Treating Time | — | 1 h |
| Identification of Crystallinity | Raman Peak at 480 cm$^{-1}$ | Absent | Absent |
|  | Raman Peak at 520 cm$^{-1}$ | Present | present |
|  | Crystallinity | Polycrystalline | Polycrystalline |
| 1st Cycle | Discharge Capacity (mAh/g) | 1250 | 1978 |
|  | Charge-Discharge Efficiency (%) | 81 | 83 |
| 5th cycle | Discharge Capacity (mAh/g) | 900 | 731 |
|  | Charge-Discharge Efficiency (%) | 75 | 75 |
| 20th cycle | Discharge Capacity (mAh/g) | 700 | 350 |
|  | Charge-Discharge Efficiency (%) | 69 | 59 |

As can be clearly seen from the results shown in Tables 8-10, the increased discharge capacities and improved charge-discharge cycle characteristics are obtained by utilizing the electrodes obtained via Examples 1-7 that use the amorphous silicon thin film for the electrode active material in accordance with the present invention, relative to utilizing the electrodes obtained via Comparative Examples 1-2 that use the polycrystalline silicon thin film for the electrode active material.

Experiment 7

An amorphous silicon thin film (about 3 μm thick) was formed on an electrolytic copper foil (18 μm thick, surface roughness Ra=0.188 μm, mean spacing S=6 μm) by an RF sputtering technique to fabricate an electrode a-11. The thin film was deposited using single-crystal silicon as a target, at a sputtering gas (Ar) flow rate of 100 sccm, an ambient substrate temperature (not heated), a reaction pressure of 0.1 Pa, and 200 W RF power.

The resulting silicon thin film was analyzed by Raman spectroscopy which detected the presence of a peak around 480 cm$^{-1}$ and the absence of a peak around 520 cm$^{-1}$. This revealed an amorphous nature of the silicon thin film.

The electrode a-11 thus obtained was used to construct a battery A11 in the same manner as in the above Experiment 1. The battery was subjected to a charge-discharge cycle test under the same conditions as in the above Experiment 1 to measure a capacity retention rate on the 30th-cycle. The result is shown in Table 11. In Table 11, the results for the batteries A1 and A3 are also shown.

TABLE 11

| Battery | 30th-Cycle Capacity Retention Rate |
|---|---|
| A1 | 91% |
| A3 | 97% |
| A11 | 97% |

As apparent from the results shown in Table 11, the battery A11 using the sputter deposited amorphous silicon thin film for the active material also exhibits a good capacity retention rate comparable to those of the batteries A1 and A3 using the microcrystalline silicon thin film for the active material.

Figure 39:
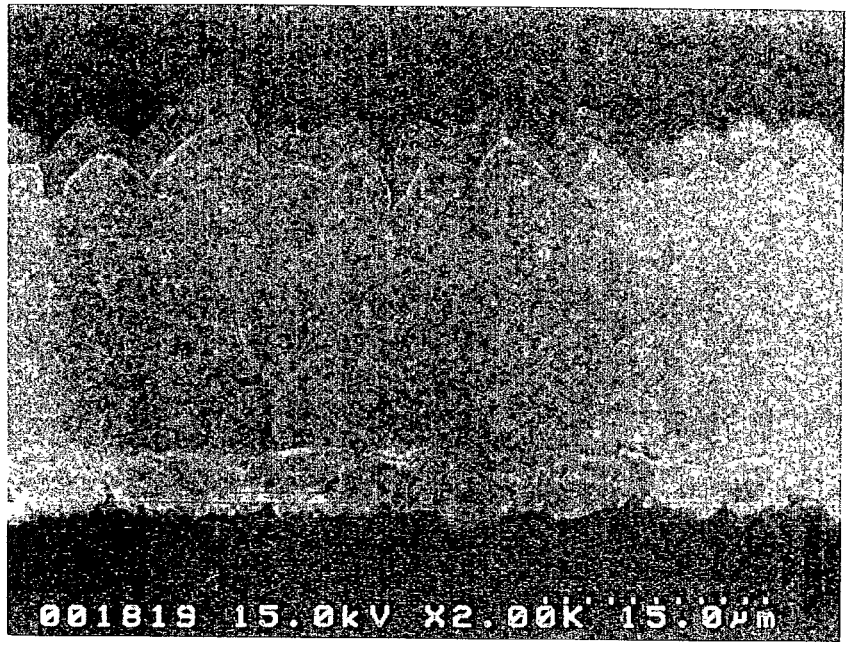
FIG. 39 is a photomicrograph (at a magnification of 2,000×) taken using a scanning electron microscope, showing a section of an electrode a-11 in accordance with the present invention before charge and discharge.
Figure 40:
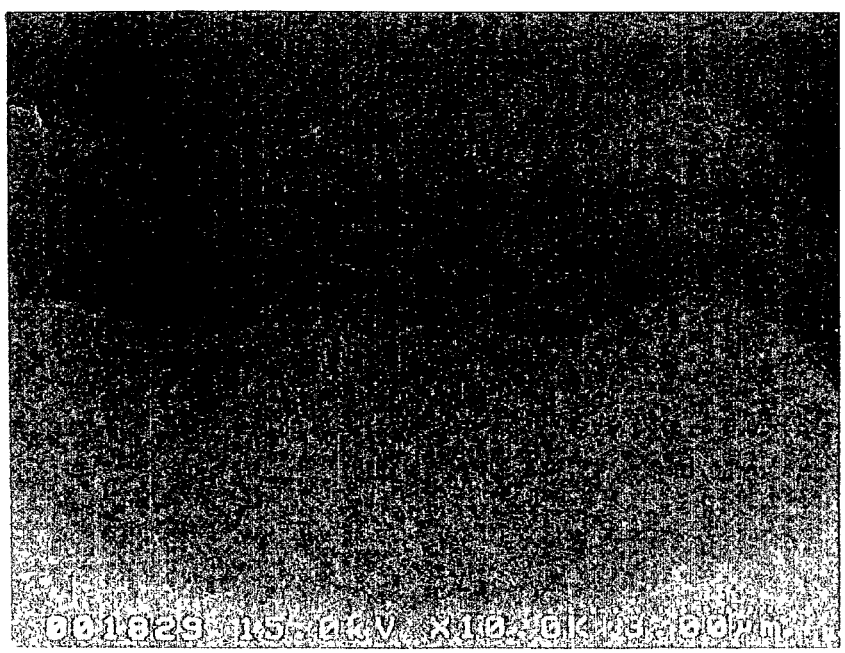
FIG. 40 is a photomicrograph (at a magnification of 10,000×) taken using a scanning electron microscope, showing a section of the electrode a-11 in accordance with the present invention before charge and discharge.

The condition of the silicon thin film in the electrode a-11 was observed using an electron microscope. First, a section of the electrode a-11 in its state before charge and discharge was observed with a scanning electron microscope. FIGS. 39 and 40 are photomicrographs (secondary electron images) taken with a scanning electron microscope, each showing a section of the electrode a-11 before charge and discharge. FIGS. 39 and 40 are taken at magnifications of 2,000× and 10,000×, respectively. A sample was prepared by following the procedure used to prepare the samples shown in FIGS. 2 and 3, i.e., by embedding the electrode in a resin and then slicing the resin-embedded electrode.

In FIGS. 39 and 40, a portion that appears relatively light indicates the electrolytic copper foil. The deposited silicon thin film (about 3 μm thick) is found as a dark portion on the copper foil. As shown in FIGS. 39 and 40, irregularities are defined on a surface of the electrolytic copper foil. Particularly, projections have a generally conical shape. Similar irregularities with such conical projections are also formed on a surface of the silicon thin film deposited on the copper foil. Accordingly, the surface irregularities of the silicon thin film appear to conform in shape to those defined on the copper foil surface.

Figure 41:
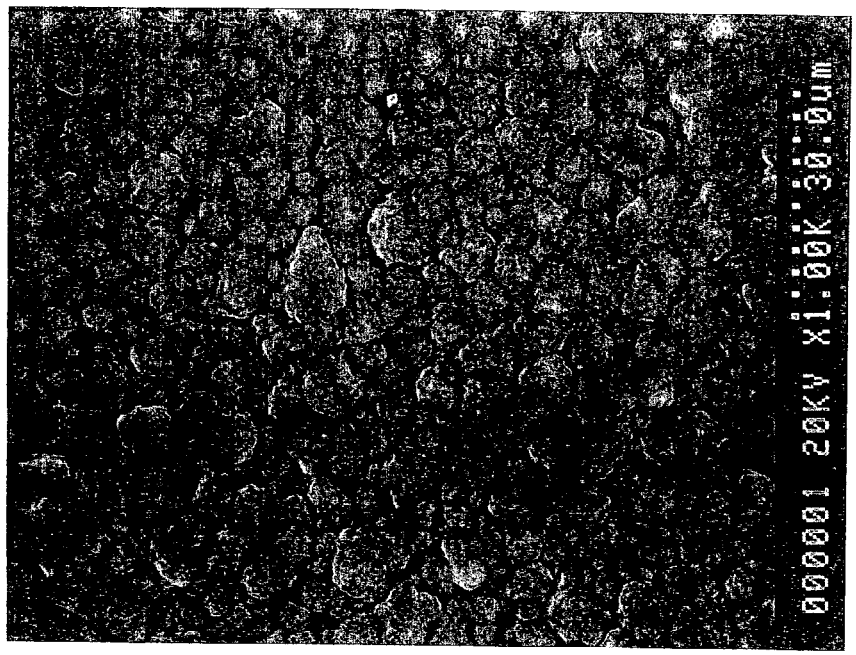
FIG. 41 is a photomicrograph (at a magnification of 1,000×) taken using a scanning electron microscope, showing a silicon thin film of the electrode a-11 in accordance with the present invention before charge and discharge, when viewed from above.

FIG. 41 is a photomicrograph (secondary electron image) taken with a scanning electron microscope, showing a surface of the silicon thin film in the electrode a-11 when viewed at a magnification of 1,000×. As shown in FIG. 41, a number of projections is formed on the silicon thin film surface. As shown in FIGS. 39 and 40, these projections are formed in such a way to follow those defined on the copper foil surface.

Figure 42:
FIG. 42 is a photomicrograph (at a magnification of 1,000×) taken using a scanning electron microscope, showing a silicon thin film of the electrode a-11 in accordance with the present invention after charges and discharges, when viewed from above.

FIG. 42 is a photomicrograph (reflection electron image) taken with a scanning electron microscope, showing a surface of the electrode a-11 removed from the battery A11 after 30 cycles in the charge-discharge test. FIG. 42 is a photograph taken at a magnification of 1,000×.

As shown in FIG. 42, gaps (spaces) are formed in the silicon thin film to extend in its thickness direction and these gaps (spaces) divide the silicon thin film into columns. In the silicon thin film shown in FIGS. 6-9, the gaps are formed in such a way as to define columnar portions each encompassing a single projection on the thin film. On the other hand, in the silicon thin film shown in FIG. 42, the gaps are formed in such a way as to define columnar portions each encompassing plural projections on the thin film. It is also found that the gaps (spaces) are wider in the silicon thin film shown in FIG. 42 than in the silicon thin film shown in FIGS. 6-9.

The battery A11 exhibits a good capacity retention in a manner similar to the battery A3. This is believed to demonstrate that the spaces provided in a way to surround the columnar portions serve to relax the stress caused by expansion and shrinkage of the active material so that charge-discharge cycling can be repeated without occurrence of separation of the active material from the current collector, even in the case where each columnar portion is defined to encompass plural projections on the thin film surface.

Experiment 8

An about 2 μm thick, microcrystalline silicon thin film was formed on both a rolled copper foil and an electrolytic copper foil (18 μm thick) under the same thin film-forming conditions as used in the fabrication of electrode a1 in Experiment 1. Then, a 17 mm diameter piece was punched out from each sample to provide an electrode c1 incorporating the silicon thin film formed on the rolled copper foil and an electrode c3 incorporating the silicon thin film formed on the electrolytic copper foil. Pieces identical to the electrodes c1 and c3 were heat treated at 400° C. for 3 hours to provide electrodes c2 and c4, respectively.

The procedure of Experiment 1 was followed, except that the electrodes c1-c4 were used for the negative electrode, to construct rechargeable lithium batteries C1-C4. These batteries were measured for charge-discharge cycle life characteristics in the same manner as in Experiment 1. Also, a hydrogen content, a ratio of Raman peak intensities (480 cm$^{-1}$/520 cm$^{-1}$) and a crystal grain size were measured for the silicon thin film of each electrode in the same manner as in Experiment 1. The results are shown in Table 12.

TABLE 12

| Battery | 50th-Cycle Capacity Retention Rate | Hydrogen Content | Ratio of Peak Intensities (480 cm$^{-1}$/520 cm$^{-1}$) | Crystal Grain Size |
|---|---|---|---|---|
| C1 | 90% | 4% | 0.1 | 1 nm |
| C2 | 85% | 0.01% | 0.1 | 1 nm |
| C3 | 91% | 4% | 0.1 | 1 nm |
| C4 | 87% | 0.01% | 0.1 | 1 nm |

As demonstrated by the results shown in Table 12, the markedly high capacity retention rates are also obtained for the batteries C1-C4 with the about 2 μm thick microcrystalline silicon thin film.

The electrode c1 incorporating the microcrystalline silicon thin film formed on the rolled copper foil was sliced in its thickens direction to provide a sample which was subsequently observed with a transmission electron microscope.

Figure 43:
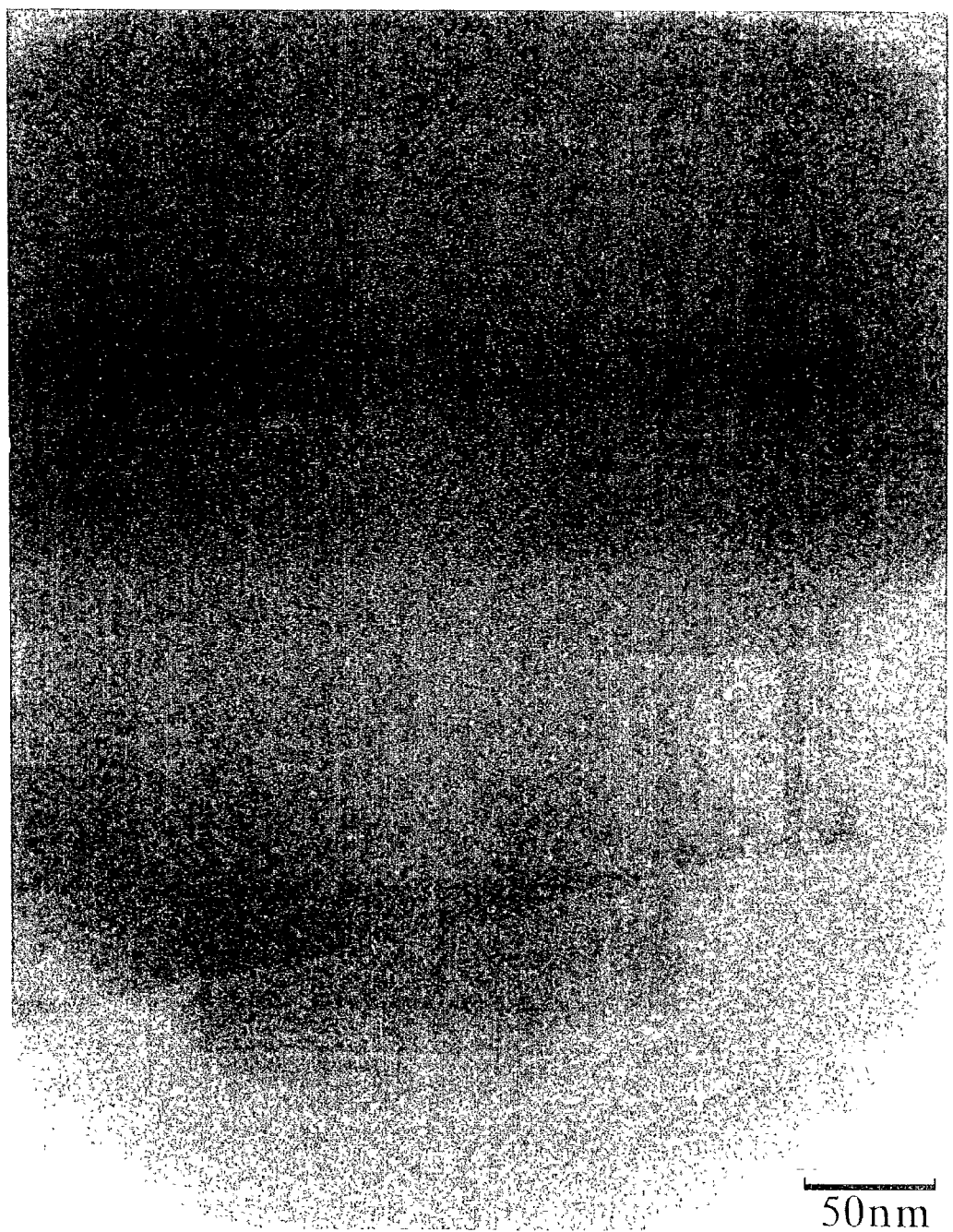
FIG. 43 is a photomicrograph (at a magnification of 500,000×) taken using a transmission electron microscope, showing an interface between a copper foil and a silicon thin film and its vicinities.
Figure 44:
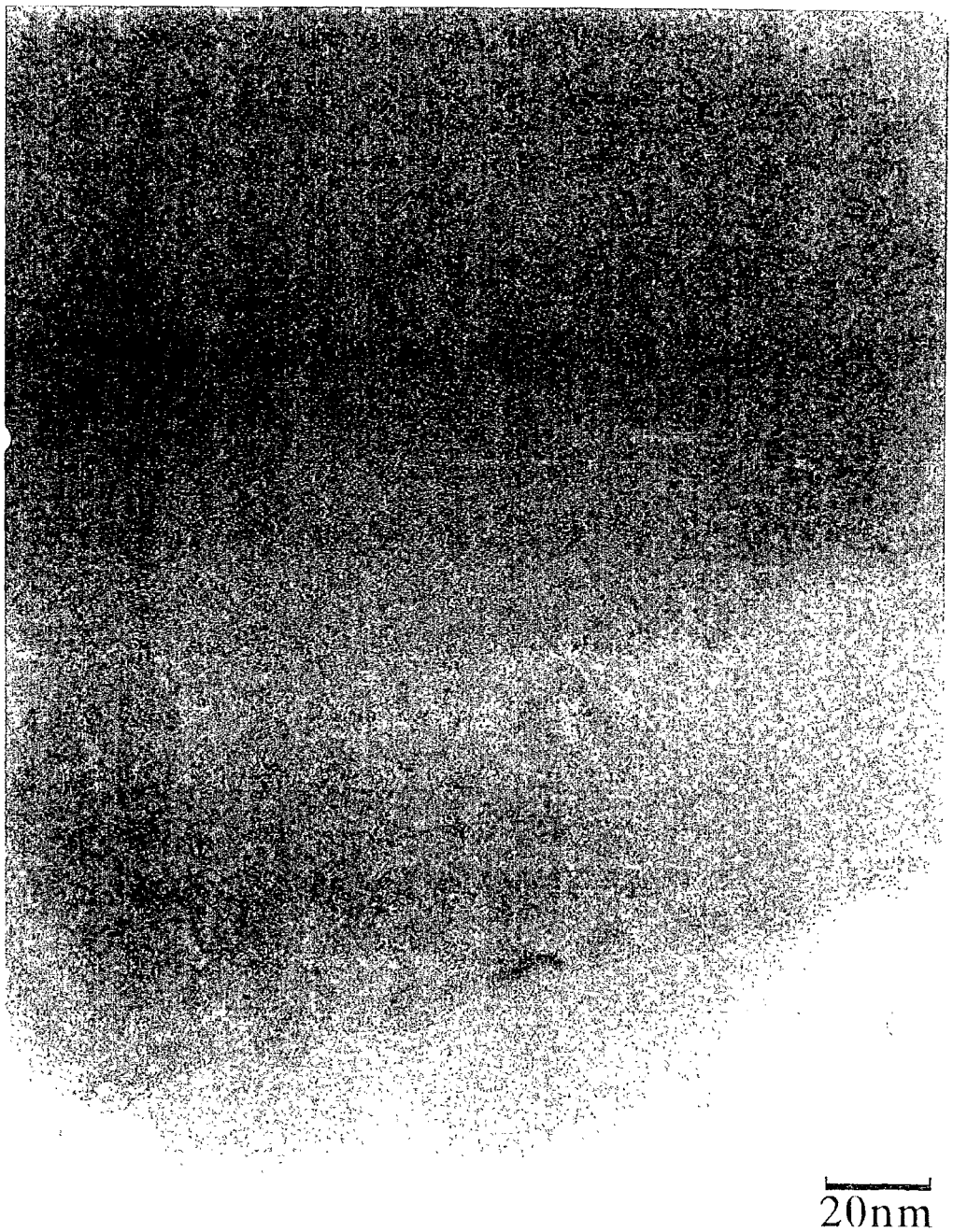
FIG. 44 is a photomicrograph (at a magnification of 1,000,000×) taken using a transmission electron microscope, showing an interface between a copper foil and a silicon thin film and its vicinities.

FIGS. 43 and 44 are photomicrographs taken with a transmission electron microscope, showing an interface between the copper foil and the silicon thin film and its vicinities in the electrode c1. FIGS. 43 and 44 are taken at magnifications of 500,000× and 1,000,000×. The copper foil is found in a lower portion and the silicon thin film in an upper portion of each photomicrograph.

In FIGS. 43 and 44, a lightened lower portion appears to be a copper foil portion. A portion located in the vicinity of the interface between the copper foil and silicon thin film appears darkened toward the above. This portion (about 30 nm—about 100 nm) seems to be a part of a mixed layer where diffusion of copper from the copper foil into silicon is particularly significant. In this mixed layer, copper (Cu) is probably alloyed with silicon (Si). Also in FIGS. 43 and 44, a particulate portion is observed in the vicinity of an interface between the seeming mixed layer and the copper foil. This particulate portion is found to define an irregular profile along the interface as a result of the diffusion of copper (Cu) into silicon (Si).

Figure 45:
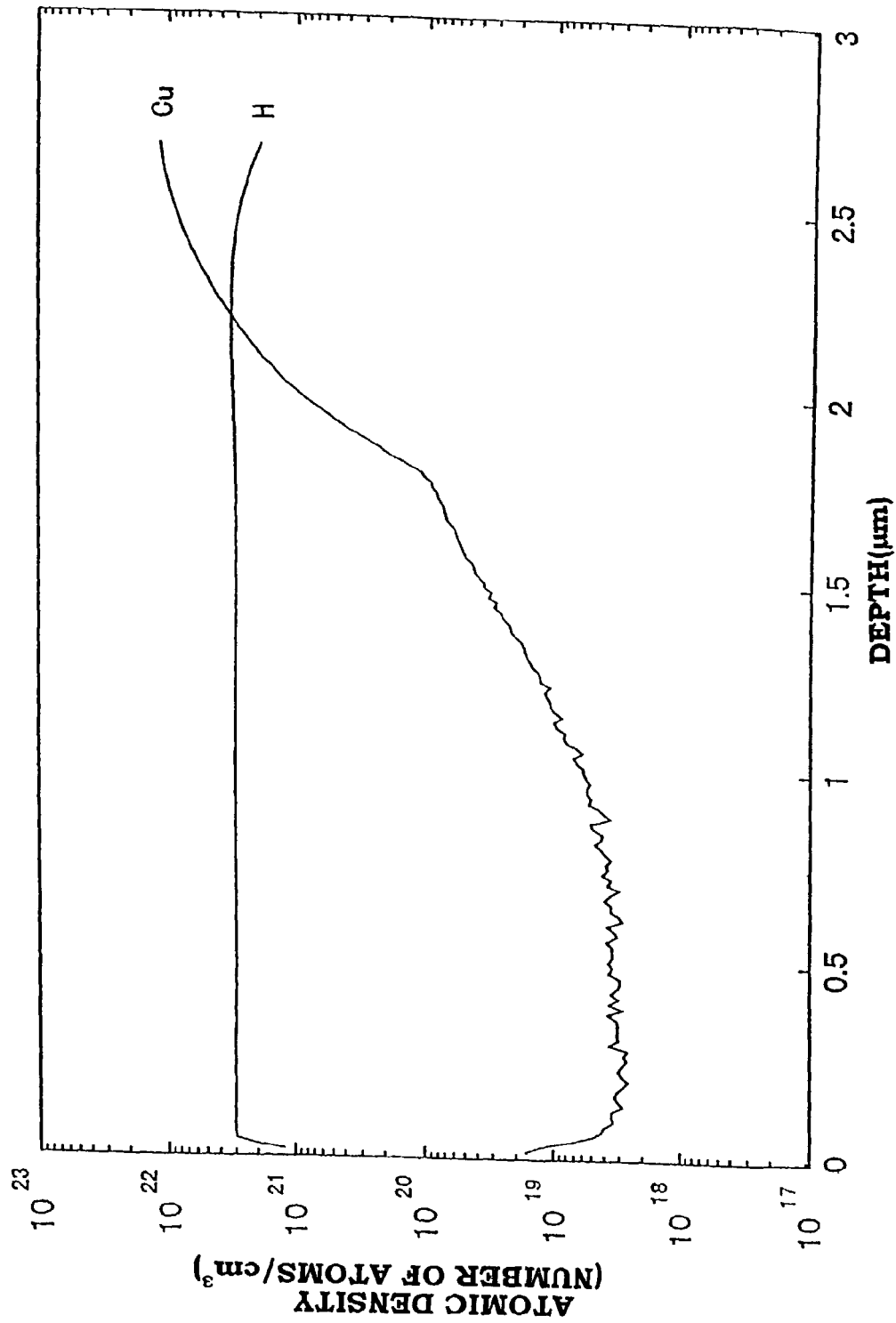
FIG. 45 is a graphical representation, illustrating concentration profiles of copper and hydrogen in a mixed layer in an electrode c1 along the depth of the layer.

Next, concentration profiles of constituent elements along the depth of the mixed layer were observed. For this purpose, the concentrations of copper ($^{63}Cu^+$) and hydrogen ($^1H^+$) were measured by SIMS using $O_2^+$ as a sputtering source. FIG. 45 shows a concentration profile of each constituent element. The abscissa indicates a depth (μm) and the ordinate indicates an atomic density (number of atoms/cm$^3$).

As shown in FIG. 45, the concentration of copper (Cu) in the mixed layer increases at a deeper location, i.e., at a location closer to the copper foil. If the mixed layer is defined as a layer in the silicon thin film that contains at least 1% ($10^{20}$ atoms/cm$^3$, if expressed in atomic density) of a current collector material, the mixed layer is found to exist in a thickness region which extends from a depth of about 1.9 μm to a depth of about 2.7 μm.

Figure 46:
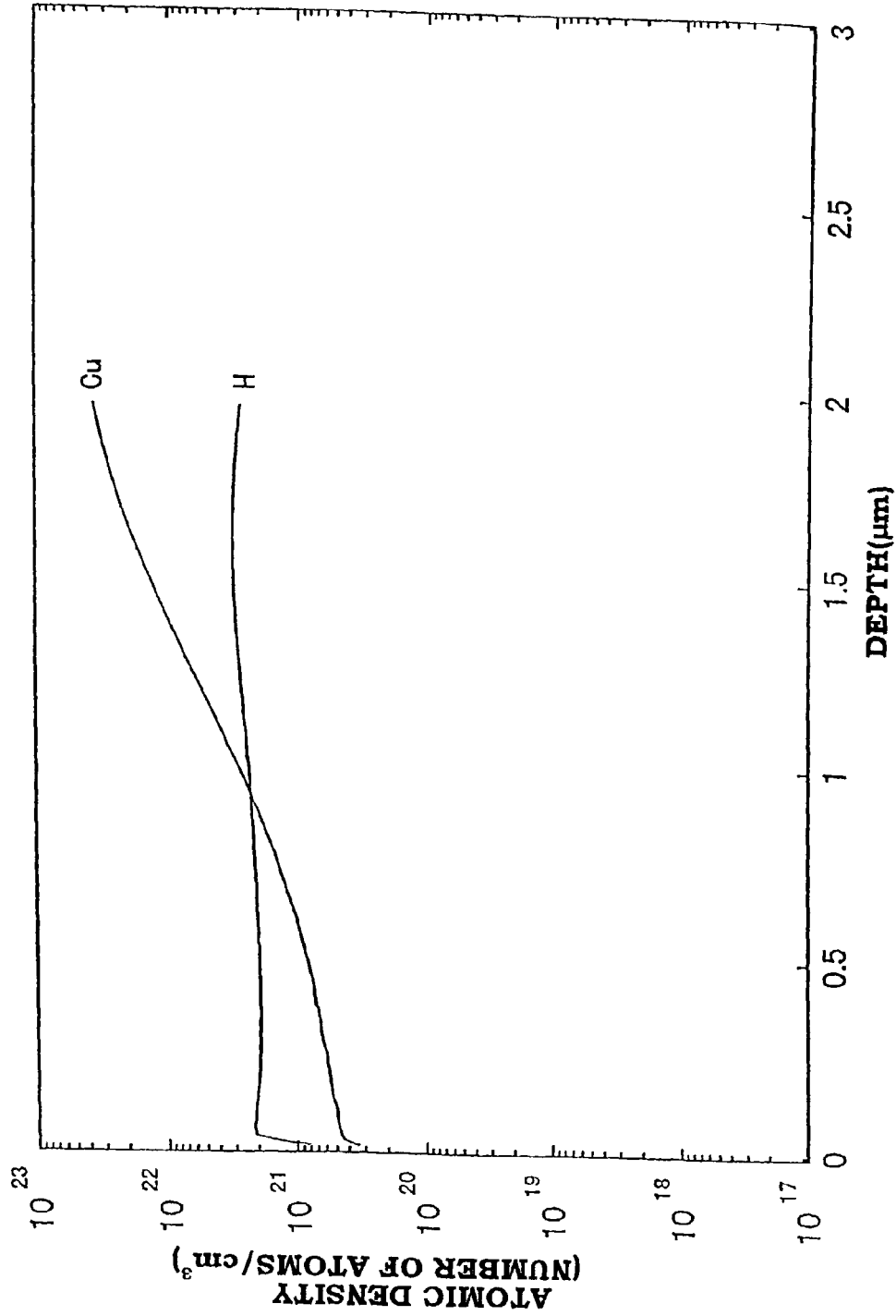
FIG. 46 is a graphical representation, illustrating concentration profiles of copper and hydrogen in a mixed layer in an electrode c3 along the depth of the layer.

Similarly, a concentration profile of each constituent element along the depth of the mixed layer were observed using SIMS for the electrode c3 incorporating the about 2 μm thick microcrystalline silicon thin film formed on the electrolytic copper foil. The results are shown in FIG. 46. As shown in FIG. 46, the atomic density of copper already exceeds $10^{20}$ atoms/cm$^3$ at the surface of the silicon thin film in the electrode c3. This clearly indicates that the copper diffused across the silicon thin film to its surface to render the silicon thin film into the form of mixed layer in its entirety. Also, the battery C3 using this electrode c3 exhibits good charge-discharge cycle characteristics. This demonstrates that the silicon thin film still serves as electrode active material, even if it is rendered into the form of mixed layer in its entirety.

As can be clearly seen from FIGS. 45 and 46, the copper concentration varies continuously across the silicon thin film. This accordingly demonstrates that copper exists in the silicon thin film not in the form of an intermetallic compound with silicon but in the form of a solid solution with silicon.

As discussed above, it is ascertained that the mixed layer where copper in the copper foil is mixed with silicon in the silicon thin film is formed at the interface between the copper foil and silicon thin film. The presence of this mixed layer is believed to improve adhesion of the silicon thin film to the copper foil, prevent separation of the silicon thin film from the copper foil as a substrate even if the silicon thin film is subjected to expansion and shrinkage on charge and discharge, and provide good charge-discharge cycle characteristics.

UTILITY IN INDUSTRY

Rechargeable lithium batteries which exhibit high charge-discharge capacities and good charge-discharge cycle characteristics can be obtained with the use of the electrode in accordance with the present invention.

The invention claimed is:

1. An electrode for a lithium battery having an electrode active material layer provided on a current collector, said electrode active material layer being a thin film composed of active material which stores lithium via formation of an alloy with lithium;
   said electrode being characterized in that a constituent of said current collector is diffused into said thin film, said thin film has irregularities on its surface and is divided into columns by gaps formed therein to extend in a thickness direction of the thin film from valleys of the irregularities on the thin film surface toward the current collector and surround said columns and define spaces between said columns such that said columns extend in a thickness direction of the thin film and are separated by said gaps, and said columnar portions are at their bottoms adhered to the current collector.

2. The electrode for a lithium battery as recited in claim 1, characterized in that the diffusion of the current collector constituent allows the thin film to be subjected to less expansion and shrinkage in the vicinity of the current collector accompanied by lithium storage and release so that the thin film can be kept adhered to the current collector.

3. The electrode for a lithium battery as recited in claim 1, characterized in that the concentration of said current collector constituent in the thin film is higher in the vicinity of the current collector and is lower at a location closer to the thin film surface.

4. The electrode for a lithium battery as recited in claim 1, characterized in that said diffused current collector constituent forms a solid solution with a component of the thin film.

5. The electrode for a lithium battery as recited in claim 1, characterized in that a region of the thin film into which said current collector constituent is diffused has a thickness of 1 μm or greater.

6. The electrode for a lithium battery as recited in claim 1, characterized in that said current collector constituent is copper and said thin film component is silicon or germanium.

7. The electrode for a lithium battery as recited in claim 1, characterized in that said thin film is composed of at least one material that can produce compounds or solid solutions with lithium, selected from elements from Groups IIB, IIIB, IVB and VB of the periodic table.

8. The electrode for a lithium battery as recited in claim 7, characterized in that said element is at least one selected from carbon, silicon, germanium, tin, lead, aluminum, indium, zinc, cadmium, bismuth and mercury.

9. The electrode for a lithium battery as recited in claim 7, characterized in that said element is silicon or germanium.

10. The electrode for a lithium battery as recited in claim 1, characterized in that said thin film is a noncrystalline thin film.

11. The electrode for a lithium battery as recited in claim 1, characterized in that said thin film is an amorphous thin film.

12. The electrode for a lithium battery as recited in claim 1, characterized in that said thin film is a noncrystalline silicon thin film.

13. The electrode for a lithium battery as recited in claim 1, characterized in that said thin film is a microcrystalline or amorphous silicon thin film.

14. The electrode for a lithium battery as recited in claim 1, characterized in that said thin film is a noncrystalline germanium thin film.

15. The electrode for a lithium battery as recited in claim 1, characterized in that said thin film is a microcrystalline or amorphous germanium thin film.

16. The electrode for a lithium battery as recited in claim 1, characterized in that said thin film is a microcrystalline or amorphous silicon-germanium alloy thin film.

17. The electrode for a lithium battery as recited in claim 1, characterized in that at least a half of thickness portion of said thin film is divided into columns by said gaps.

18. The electrode for a lithium battery as recited in claim 1, characterized in that said gaps are formed as a result of expansion and shrinkage of said thin film.

19. The electrode for a lithium battery as recited in claim 1, characterized in that said gaps are formed by a charge-discharge reaction after said electrode is assembled into a battery.

20. The electrode for a lithium battery as recited in claim 1, characterized in that said gaps are formed by a charge-discharge reaction before said electrode is assembled into a battery.

21. The electrode for a lithium battery as recited in claim 1, characterized in that said irregularities on the surface of the thin film are formed to conform in shape to those on the current collector surface.

22. The electrode for a lithium battery as recited in claim 21, characterized in that projections of the irregularities on the current collector surface have a substantially conical shape.

23. The electrode for a lithium battery as recited in claim 1, characterized in that said columnar portions have a round top.

24. The electrode for a lithium battery as recited in claim 1, characterized in that said thin film before said gaps are formed therein has low-density regions connected to each other like a network in a planar direction and extending in the thickness direction toward the current collector, and the gaps are later formed in the thin film to extend in its thickness direction along said low-density regions.

25. The electrode for a lithium battery as recited in claim 1, characterized in that said current collector comprises at least one material selected from copper, nickel, stainless steel, molybdenum, tungsten and tantalum.

26. The electrode for a lithium battery as recited in claim 1, characterized in that said current collector has irregularities on its surface.

27. The electrode for a lithium battery as recited in claim 1, characterized in that said current collector has a surface roughness Ra in the range of 0.01-1 µm.

28. The electrode for a lithium battery as recited in claim 1, characterized in that said current collector comprises a copper foil.

29. The electrode for a lithium battery as recited in claim 28, characterized in that said copper foil is an electrolytic copper foil.

30. The electrode for a lithium battery as recited in claim 1, characterized in that said thin film is a thin film formed by a CVD, sputtering, vapor evaporation, spraying or plating process.

31. The electrode for a lithium battery as recited in claim 1, characterized in that lithium is previously stored or incorporated in the thin film.

32. A lithium battery including a negative electrode comprising the electrode as recited in claim 1, a positive electrode and an electrolyte.

33. A rechargeable lithium battery including a negative electrode comprising the electrode as recited in claim 1, a positive electrode and a nonaqueous electrolyte.

34. An electrode for a lithium battery having an electrode active material provided on a current collector, said electrode active material layer being a thin film composed of active material which stores lithium via formation of an alloy with lithium;
   said electrode being characterized in that a constituent of said current collector is diffused into said thin film, said thin film is divided into columns by gaps formed therein which surround said columns and define spaces between said columns such that said columns extend in a thickness direction of the thin film and are separated by said gaps, and said columnar portions are at their bottoms adhered to the current collector
   wherein said gaps provided around said columnar portions serve to relax a stress resulting from expansion and shrinkage of said active material layer during charge-discharge cycles.

35. The rechargeable lithium battery as recited in claim 33, characterized in that said positive electrode contains, as active material, an oxide capable of lithium storage and release.

36. The rechargeable lithium battery as recited in claim 33, characterized in that said positive electrode contains, as active material, a lithium-containing oxide.

* * * * *